(12) United States Patent
Suzuki et al.

(10) Patent No.: US 12,365,634 B2
(45) Date of Patent: Jul. 22, 2025

(54) HIGHLY DENSE BRITTLE-MATERIAL STRUCTURAL MEMBER HAVING IMPREGNATING PROPERTY

(71) Applicant: NATIONAL INSTITUTE OF ADVANCED INDUSTRIAL SCIENCE AND TECHNOLOGY, Tokyo (JP)

(72) Inventors: Muneyasu Suzuki, Tsukuba (JP); Jun Akedo, Tsukuba (JP); Shusuke Kanazawa, Tsukuba (JP); Motoshi Itagaki, Tsukuba (JP); Shun Hasegawa, Tsukuba (JP); Tetsuo Tsuchiya, Tsukuba (JP); Hirobumi Ushijima, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 350 days.

(21) Appl. No.: 17/528,450

(22) Filed: Nov. 17, 2021

(65) Prior Publication Data
US 2022/0073434 A1  Mar. 10, 2022

Related U.S. Application Data

(63) Continuation of application No. PCT/JP2020/020993, filed on May 27, 2020.

(30) Foreign Application Priority Data

May 29, 2019  (JP) ................................. 2019-100705

(51) Int. Cl.
C04B 38/00  (2006.01)
C04B 35/491  (2006.01)
(Continued)

(52) U.S. Cl.
CPC ........ *C04B 38/0054* (2013.01); *C04B 35/491* (2013.01); *C04B 41/009* (2013.01);
(Continued)

(58) Field of Classification Search
None
See application file for complete search history.

(56) References Cited

U.S. PATENT DOCUMENTS

2004/0241976 A1    12/2004 Fukuhisa et al.
2005/0118097 A1*    6/2005 Sakon ................. C04B 35/6303
                                                 423/625

(Continued)

FOREIGN PATENT DOCUMENTS

CN        1564876 A      1/2005
CN      102376755 A      3/2012
(Continued)

OTHER PUBLICATIONS

English translation of Kurata et al. (JP 2012-219149) (Year: 2012).*
(Continued)

*Primary Examiner* — Ronak C Patel
(74) *Attorney, Agent, or Firm* — ROSSI, KIMMS & McDOWELL LLP

(57) ABSTRACT

Disclosed is a highly dense aggregate of brittle material particles having an interface at which the particles are bonded to each other and pores between the brittle material particles structuring the highly dense aggregate, where a porosity which is a volume ratio of the pores with respect to the whole of the highly dense aggregate is equal to or less than 20%, and a volume ratio of the pores communicating with an apparent outer surface of the highly dense aggregate with respect to a volume of all of the pores of the highly dense aggregate is equal to or higher than 65%.

14 Claims, 20 Drawing Sheets

(51) Int. Cl.
  *C04B 41/00* (2006.01)
  *C04B 41/47* (2006.01)
  *C04B 41/48* (2006.01)
  *H01M 4/36* (2006.01)
  *C04B 41/45* (2006.01)

(52) U.S. Cl.
  CPC .......... *C04B 41/472* (2013.01); *C04B 41/483* (2013.01); *C04B 41/4853* (2013.01); *H01M 4/366* (2013.01); *C04B 41/4539* (2013.01); *C04B 2235/5445* (2013.01); *C04B 2235/5454* (2013.01); *C04B 2235/96* (2013.01)

(56) References Cited

U.S. PATENT DOCUMENTS

| | | |
|---|---|---|
| 2012/0044612 A1 | 2/2012 | Besling et al. |
| 2012/0231346 A1 | 9/2012 | Tsujii et al. |
| 2014/0150966 A1 | 6/2014 | Osada |
| 2016/0141713 A1 | 5/2016 | Suzuki |
| 2017/0288124 A1 | 10/2017 | Noro et al. |
| 2019/0152862 A1 | 5/2019 | Oribe et al. |
| 2019/0355970 A1 | 11/2019 | Yura |

FOREIGN PATENT DOCUMENTS

| | | |
|---|---|---|
| CN | 102576902 A | 7/2012 |
| CN | 103247820 A | 8/2013 |
| CN | 106716660 A | 5/2017 |
| EP | 3582298 A1 | 12/2019 |
| JP | 2000195482 A | 7/2000 |
| JP | 2004261746 A | 9/2004 |
| JP | 2006043993 A | 2/2006 |
| JP | 2007000780 A | 1/2007 |
| JP | 2011156517 A | 8/2011 |
| JP | 2012188335 A | 10/2012 |
| JP | 2012240884 A | 12/2012 |
| JP | 2014096350 A | 5/2014 |
| JP | 2016100069 A | 5/2016 |
| JP | 2018110527 A | 7/2018 |
| WO | 2016157122 A1 | 10/2016 |
| WO | 2018020860 A1 | 2/2018 |
| WO | 2018147387 A1 | 8/2018 |

OTHER PUBLICATIONS

English translation of Yamada et al. (JP H05132377). (Year: 1993).*
Office Action issued in Japanese Appln. No. 2021-522834 mailed Sep. 6, 2022. English machine translation provided.
English translation of Written Opinion issued in Intl. Appln. No. PCT/JP2020/020993 mailed Aug. 11, 2020, previously cited in IDS filed Nov. 17, 2021.
Uchida. "Applications Development of Advanced Alumina "Sumicorundum"." Sumitomo Kagaku. May 25, 2000: 45-49. Vol. 2000-I. English machine translation provided.
International Search Report issued in Intl. Appln. No. PCT/JP2020/ 020993 mailed Aug. 11, 2020. English translation provided.
Written Opinion issued in Intl. Appln. No. PCT/JP2020/020993 mailed Aug. 11, 2020.
Extended European Search Report issued in European Appln. No. 20815078.9 mailed Jun. 2, 2023.
Office Action issued in Chinese Appln. No. 202080039682.0, mailed on Dec. 9, 2023. English translation provided.
Office Action issued in Chinese Appln. No. 202080039682.0, mailed Jun. 12, 2024. English translation provided.
Office Action issued in Japanese Patent Application No. 2021-522834 mailed Jul. 9, 2024. English translation provided.
Office Action issued in Japanese Appln. No. 2023-105124 mailed Aug. 20, 2024. English translation provided.
Communication Pursuant to Article 94(3) EPC issued in European Appln. No. 20 815 078.9 mailed Mar. 14, 2025.

* cited by examiner

All pores

Pores communicating with outer surface

Pores isolated inside

Example 4

Comparable reference example

HIGHLY DENSE BRITTLE-MATERIAL STRUCTURAL MEMBER HAVING IMPREGNATING PROPERTY

CROSS REFERENCE TO RELATED APPLICATIONS

This application is based on and claims the benefit of priority from the prior Japanese Patent Application No. 2019-100705, filed on May 29, 2019, and the PCT Application No. PCT/JP2020/020993, filed on May 27, 2020, the entire contents of which are incorporated herein by reference.

BACKGROUND OF THE INVENTION

The present invention relates to a new structural member of oxide ceramics.

Oxide ceramics have been widely applied as electronic ceramics utilizing piezoelectric and dielectric properties. Recently, the development of a "flexible device" in which flexible organic substances such as plastics and electric ceramics are hybridized for application to wearable devices has been demanded.

In addition, with respect to an "oxide-based all-solid-state lithium ion secondary battery" which is attracting attention as a next generation storage battery, extremely high techniques are required including: preparation of a positive electrode mixture and a negative electrode mixture in which an active material of oxide ceramics, a solid-state electrolyte, and an auxiliary agent supplementing conductivity, and the like are uniformly stacked over a metal foil without any gap; and bonding of the positive electrode mixture and the negative electrode mixture with a solid-state electrolyte of an oxide without any gap.

DESCRIPTION OF THE RELATED ART

Although oxide ceramics generally have an extremely high sintering temperature for achieving highly dense sintering, plastics as well as an inexpensive and flexible foil of a metal such as aluminum and copper, which are used in flexible devices and oxide-based all-solid-state lithium ion secondary batteries, exhibit very low heat resistance temperatures and are unable to withstand the sintering temperatures and oxidative environments of the oxide ceramics.

Therefore, a variety of methods has been conventionally employed in the preparation of oxide ceramic structural members, which includes: a method in which an additive is added to decrease the sintering temperature or provide reduction resistance; a method in which a sputtering method, a PLD method, a CVD method, a MOD method (a sol-gel method), a hydrothermal method, a screen-printing method, an EPD method, a cold sintering method, or the like is applied to allow an oxide ceramics film to be deposited at a temperature lower than a sintering temperature; a method to stack raw-material particles while adjusting the shape thereof into a nano-sized sheet shape or a cube shape; and an aerosol deposition (AD) method in which raw-material particles are solidified by colliding with a base material at a normal temperature to be solidified, and the like.

It has been well known that oxide ceramics are readily influenced by a residual stress acting inside thereof because they generally exhibit a high Young's modulus and extremely high hardness. However, it has been known that the traditionally employed manufacturing methods involving a thermal treatment, such as the sputtering method, the PLD method, the CVD method, the MOD method (sol-gel method), the hydrothermal method, the screen-printing method, the EPD method, and the cold sintering method, and the like also generate a residual stress in the oxide ceramic films even in the deposition at a temperature lower than the sintering temperature due to a slight difference in linear expansion coefficient between a base material and the oxide ceramic films, leading to deterioration of performance such as piezoelectric and dielectric properties.

Moreover, it is also a problem whereby the internal compressive stress resulting from the short peening effect acts as a residual stress even in ceramics films stacked with the AD method at a normal temperature and leads to deterioration of the dielectric property.

In oxide-based all-solid-state lithium ion secondary batteries, there is a problem whereby a change of the internal stress resulting from expansion and shrinkage caused by insertion and elimination of lithium ions in the active materials causes cracks in the active material itself, leading to deterioration in performance.

The polarization mechanism of ferroelectrics exhibiting a large piezoelectric property originates from the phenomenon whereby a domain wall formed by the anisotropy of crystals moves when applied with a high electric field to achieve the polarization inversion and polarization rotation. However, it has been known that, when there is a portion in which a clear boundary is not formed, a portion in which crystallinity is not perfect (a portion in which a lattice image observed by a TEM is ambiguous), or a portion including an oxygen defect, the movement of the domain wall is pinned or clamped therein and sufficient polarization inversion and polarization rotation are inhibited, resulting in deterioration of ferroelectric and piezoelectric properties. Hence, it is necessary to synthesize an oxide with high crystallinity and reduced defects.

Similarly, lithium ions move through conductive passes formed in crystals even in oxide-based solid-state electrolytes. Thus, it is required to obtain high-quality crystals because the presence of a portion with imperfect crystallinity or a bonding material which does not exhibit ion conductivity for lithium ions between particles results in a decrease in ion conductivity.

However, there is a problem whereby it is extremely difficult to obtain high crystallinity by low temperature deposition with the traditional methods, which promote crystal growth to obtain highly dense films and include the sputtering method, the CVD method, the MOD method (sol-gel method), the hydrothermal method, the screen-printing method, the EPD method, and the cold sintering method, and the like, in addition to a problem whereby applicable base materials are quite limited.

In addition, although the AD method is capable of depositing films utilizing high-quality raw-material particles of oxide ceramics, the size effects reducing the piezoelectric and dielectric properties appear in the miniaturization of the raw-material particles that is unique in the AD method. This phenomenon causes a problem whereby ion conductivity also decreases due to the formation of a large amount of boundaries serving as a barrier for the movement of lithium ions in the oxide-based solid-state electrolytes.

It is also known as a problem that hydroxide groups remain at the boundaries in the method for depositing ceramic films in an aqueous solution, such as the hydrothermal method and the EPD method, causing an increase in a leak current of ferroelectrics and a hindrance to lithium ion conduction.

The ceramics deposition technologies such as the traditional sputtering method, PLD method, CVD method, MOD method (sol-gel method), hydrothermal method, screen printing method, and EPD method are technologies for depositing an oxide ceramic film over a base material. However, it is necessary to form a highly dense ceramic film between aluminum foils or copper foils serving as a current corrector in the oxide-based all-solid-state lithium ion secondary batteries, and a new deposition method is demanded which is capable of achieving a bonding different from that of the traditional ceramic deposition technologies.

In the AD method, a bonding is realized suitable for high densification of sulfate-based solid-state electrolyte layers by pressing the deposited sulfate-based solid electrolyte layers facing each other (Japanese Patent Application Publication No. 2016-100069). However, it is a problem to bond raw-material particles without crushing because, when the AD method is applied to oxide-based solid-state electrolytes in which lithium ions move in the crystals, miniaturization is accompanied by the formation of a number of boundaries serving as a barrier for the movement of lithium ions.

In addition, a method capable of achieving highly dense deposition under an atmospheric pressure is desired rather than the vacuum processes and the reduced-pressure processes such as the sputtering method, the PLD method, the CVD method, and the AD method.

Unlike the traditional deposition methods involving crystal growth by a thermal treatment, such as the sputtering method, the PLD method, the CVD method, the MOD method (sol-gel method), the hydrothermal method, the screen-printing method, and the EPD method, it is a problem for the pressure molding method with which a structural member is obtained by charging raw-material particles into a mold and performing pressure molding to achieve a relative density of the structural member equal to or more than 80% (porosity equal to or less than 20%) without crushing the raw-material particles as described in Uchida, Y. et al., Sumitomo Kagaku, 2000-I, P. 45.

Generally, any oxide ceramic particles certainly possess "bonding force for aggregation", and it is known that the particles tend to aggregate because a decrease in size of the particles resulting in an increase of a specific surface area allows their bonding force to work strongly. In the traditional pressure molding method, a highly densified structural member cannot be prepared because the bonding force for aggregation works before the particles completely fill the pores and because the strong frictional force resulting from the molding pressure is applied in this state. The methods involving crushing the raw-material particles such as the AD method have been employed to prepare a structural member with a relative density equal to or more than 80% (porosity of equal to or less than 20%) by pressure molding (Japanese Patent Application Publication No. 2006-043993).

In addition, the cold sintering method, which is a method to prepare highly dense oxide ceramics by disposing amorphous layers around the raw-material particles and applying a pressure thereto, has a problem whereby the amorphous layers remain around the raw-material particles in the non-thermal treatment, resulting in a decrease in a piezoelectric property, a dielectric property, and ion conductivity, and the like. Accordingly, it is also a problem that a thermal treatment sufficient for the amorphous layers to grow to high quality crystals is required. In addition, limited availability of the raw-material particles capable of forming amorphous layers is also a problem.

Although nanosheets thinly peeled from an oxide (Japanese Patent Application Publication No. 2012-240884) can be utilized to deposit highly dense oxide layers without any thermal treatment, there is a problem in depositing them to a thickness in an approximately submicron order because oxide sheets with a thickness of several nanometers are deposited one by one.

Similarly, attention has been attracted to a technology in which cube-shaped nanoparticles are regularly and three-dimensionally arranged (Japanese Patent Application Publication No. 2012-188335). However, as a matter of fact, there is a problem in providing a uniform film over a base material without any gap because an extremely small difference in size between the cube-shaped raw-material particles causes cracks across a wide region.

Pressed powder having a porosity more than 20% as well as a molding body formed by filling 20% or more of pores with a resin to bond the particles with a bonding material also have a problem whereby functionalities originating from the crystal structure cannot be obtained. For example, in the case of piezoelectrics and ferroelectrics, there are problems such as an insufficient electric field applicable to the oxides, an increase in leak current, and a decrease in breakdown strength, and the like because higher relative permittivity of oxides having functionalities than resins by 50 to 1000 times generates concentration of electric fields on the resins with lower relative permittivity. In the oxide-based all-solid-state lithium ion batteries, it is also a problem whereby Li ion diffusion required for charging and discharging does not occur because the Li ion conductivity of polymer-based electrolytes which is lower than oxide-based solid-state electrolytes by 50 to 1000 times govern the ion conductivity of the polymer-based electrolytes and diffusion of lithium required for charging and discharging does not occur even if the polymer-based electrolytes are mixed or impregnated so as to fill the pores of the oxide-based solid-state electrolytes.

BRIEF SUMMARY OF THE INVENTION

The inventors have diligently investigated a structural member capable of solving the aforementioned problems involved in the traditional technologies and found that, repetition of the transfer of a thin layer of brittle-material particles such as PZT formed over a transfer plate onto a base material under a pressure lower than that at which the particles are crushed enables the production of a structural member with porosity of 20% or less in which the particles are densely arranged, and previously applied for a patent (Japanese Patent Application Publication No. 2018-110527 which was not laid open at the time when the present invention was applied). The inventors also found that the structural member has mesh-shaped minute nanopores spreading throughout the structure between the densely arranged particles and that the structural member is able to solve the aforementioned problems. A fluid organic substance such as a resin and silicon oil may be impregnated into the nanopores, and the fluid resin may be cured after impregnating into the highly dense aggregate.

Specifically, a structure of an extremely dense aggregate with porosity of 20% or less is prepared by filling pores which still exist between densely arranged first particles with a large particle diameter with second particles smaller than the first particles.

The highly dense aggregate according to the present invention maintains functionalities originating from a crystal structure thereof because the raw-material particles are negligibly crushed in the aforementioned preparation method, and has a mesh-shaped structure in which almost all of the pores are linked by suppressing crystal growth and crush of the raw-material particles as much as possible. Since the highly dense aggregate of the present invention can be regarded as a structure in which the pores existing in the mixed powder of the first particles and the second particles are reduced so that the distance between the particles becomes a nano-meter region, the highly dense aggregate of the present invention has a feature whereby the specific surface area of the powder is almost the same as the specific surface area of the highly dense aggregate of the present invention The pore structure of this highly dense aggregate preferably includes a nanopore formed by the second particles in the pore between the first particles as shown in FIG. 1A.

In contrast, in the general sintered body that experienced a thermal treatment, nanopores disappear due to the crystal growth, and high densification involving the crush of raw-material particles similarly destroys the nano-level pores, resulting in a structure in which the pores including grain-boundary triple points are interspersed as shown in FIG. 1B.

The following is an example for the preparation of the highly dense aggregate.

A metal plate having an elastic modulus which is high enough to prevent a brittle material from remaining during pressure transfer is used as a transfer plate, and first particles with a large particle diameter size are first attached thereon when the particles consisting of the brittle material are attached onto the transfer plate. After that, second particles having a smaller particle diameter size than the first particles are attached thereon. A base material consisting of a metal having an elastic modulus which is sufficiently low to allow the brittle material to be attached in the pressure transfer or consisting of carbon is arranged on a side on which the second particles are attached, and a pressure lower than a pressure which crushes these particles is applied, thereby transferring a thin layer of the brittle material attached to the transfer plate onto the base material. Then, the first particles and the second particles are attached onto the transfer plate with the same method. The side of the thin layer of the brittle material of the base material onto which the thin layer of the brittle material is transferred is arranged on a side onto which the second particles are attached, and a pressure is applied so that the thin layer of the brittle material attached onto the transfer plate is transferred and stacked onto the thin layer of the base material. A structural member of the brittle material having a desired thickness is prepared over the base material by repeating these processes.

In the formation of the thin layer of the brittle material on the transfer plate, the first particles with a large particle diameter size may be first attached, a mixture of the first particles and the second particles with a smaller particle diameter size than the first particles may be attached thereon, and then the second particles may be further attached thereon.

Furthermore, vibration may be applied in a lateral direction when performing the pressure transfer of the thin layer of the brittle material attached onto the transfer plate onto the base material.

Specifically, the present application provides the following inventions.

(1) A highly dense aggregate of brittle material particles including: an interface at which the brittle material particles structuring the highly dense aggregate are bonded to each other; and pores between the brittle material particles, where a porosity which is a volume ratio of the pores with respect to the whole of the highly dense aggregate is equal to or less than 20%, and a ratio of a volume of the pores which communicate with an apparent outer surface of the highly dense aggregate with respect to the volume of the pores of the whole of the highly dense aggregate is equal to or more than 65%.

(2) The highly dense aggregate described in (1) characterized in that: the brittle particles structuring the highly dense aggregate consist of first brittle particles and second brittle particles smaller than the first brittle particles; the highly dense aggregate has the second particles in the pores between the first particles bonding to each other; and the highly dense aggregate further has pores between the plurality of second particles in the pores between the first particles and between the second particles and the first particles at a periphery of the second particles.

(3) The highly dense aggregate described in (2) characterized in that a particle diameter size of the second particles is equal to or less than 1 μm.

(4) The highly dense aggregate described in (1) characterized in that an average pore width between the brittle-material particles is equal to or less than 200 μm.

(5) The highly dense aggregate described in any of (1) to (4), where the pores of the highly dense aggregate are impregnated with silicon oil, a fluid in which nanoparticles with a particle diameter of 100 nm or less are dispersed, or a fluid resin.

(6) The highly dense aggregate described in (5), where the fluid resin impregnated in the highly dense aggregate is cured.

(7) An electric element unit formed by sequentially stacking a film consisting of the highly dense aggregate described in any of (1) to (4), an electrode layer, and a mesh-shaped foil having electric conductivity on a base material and characterized in that a resin is impregnated in the highly dense aggregate.

(8) An electric element unit formed by stacking a plurality of units described in (7).

(9) A solid-state battery including a first polymer impregnated in the highly dense aggregate described in any of (1) to (4) and characterized in that the first polymer has ion conductivity.

(10) The solid-state battery described in (9), including:
the first polymer; and
a second polymer formed over the first polymer,
where the second polymer includes brittle-material particles.

(11) The solid-state battery described in (10), where the solid-state battery has a bent shape.

(12) The solid-state battery described in (10) or (11), where the solid-state battery is folded and stacked.

Effects of the Invention

According to the present invention, a powder of raw-material particles of brittle materials having high crystallinity is thinly pressure-molded by pressing at a pressure lower than that under which the particles are crushed to form a structural member in which the raw-material particles are highly densely arranged, over which a structural member in which the raw-material particles are similarly highly densely arranged is stacked by pressure molding so as to be integrated, thereby allowing the production of a highly dense aggregate formed by the aggregation of the raw-material particles and having a relative density equal to or more than 80% (porosity equal to or less than 20%).

In addition, the minute second particles have high interface free energy at a liquid/solid interface formed by contact with a liquid and exhibit excellent wettability proven by a low contact angle of the liquid. Since almost all of the pores of the highly dense aggregate of the present invention are formed by the minute second particles, and the pore width thereof is extremely narrow as much as 200 nm or less, the highly dense aggregate of the present invention has a feature whereby a strong capillary phenomenon occurs therein. That is, in contrast to the conventional ceramics whose barrier property against gas and liquid increases with increasing density, the highly dense aggregate of the present invention does not exhibit any barrier property against liquid and has extremely high impregnability even if the densification proceeds. Accordingly, the highly dense aggregate of the present invention is able to allow the structural member to be thoroughly impregnated with even a liquid with high viscosity or high surface tension.

Since the brittle-material structural member of the present invention is formed by the aggregation of the raw-material particles, the brittle-material structural member is capable of maintaining the high crystallinity of the original raw-material particles, and an internal stress is negligibly generated.

According to the present invention, it is not necessary to perform the sintering treatment, crush the raw-material particles, or perform processes under a vacuum or at a reduced pressure, and the like, which have been conventionally required to prepare highly-density oxide ceramic structural bodies, and it is possible to suppress the generation of defects or internal stress in the crystal caused by these traditional processes.

According to the present invention, there is an effect to suppress deposition shrinkage compared with the traditional ceramic-industrial method involving a thermal treatment even when the highly dense aggregate is subjected to a sintering treatment.

According to the present invention, the intensity of an electric field applied to the brittle material particles of the piezoelectrics or ferroelectrics can be controlled by impregnating the highly dense aggregate of piezoelectrics or ferroelectrics with silicon oil, a resin, or nanoparticles or the like. Specifically, it is possible to increase an anti-electric field and improve breakdown intensity by impregnating a material with a permittivity lower than the brittle-material particles of the piezoelectrics or ferroelectrics. It is also possible to increase the intensity of the electric-filed applied to the brittle-material particles of the piezoelectrics or ferroelectrics, to decrease the anti-electric field, and to improve the piezoelectric property by impregnating nanoparticles having a larger relative permittivity than the brittle-material particles of the piezoelectrics or ferroelectrics. In addition, a polymer-based solid-state electrolyte is impregnated into the highly dense aggregate of an oxide-based solid-state electrolyte, by which a density of the oxide-based solid-state electrolyte can be improved so that lithium ions are able to rapidly move, the moving distance of the lithium ions in the polymer-based solid-state electrolyte can be shortened, and diffusibility of the lithium ions can be increased.

BRIEF DESCRIPTION OF THE DRAWINGS

FIG. 16A to FIG. 16E are schematic drawings showing a manufacturing procedure of the solid-state battery obtained by impregnating polymer-based electrolytes into a positive electrode sheet and a negative electrode sheet, bonding the positive electrode sheet and the negative electrode sheet with the polymer-based electrolytes provided on the surfaces of the sheets, and then crosslinking the polymer-based electrolytes, whereas

EXAMPLES

Figure 1A:
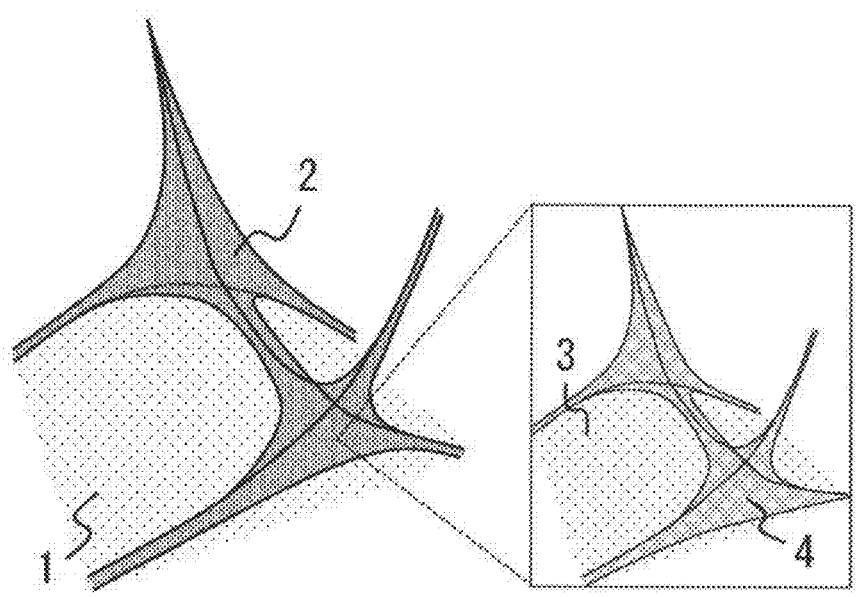
FIG. 1A and FIG. 1B are schematic drawings showing a difference in pore structure between the highly dense aggregate according to the present invention and the traditional high-density ceramic sintered body.
Figure 1B:
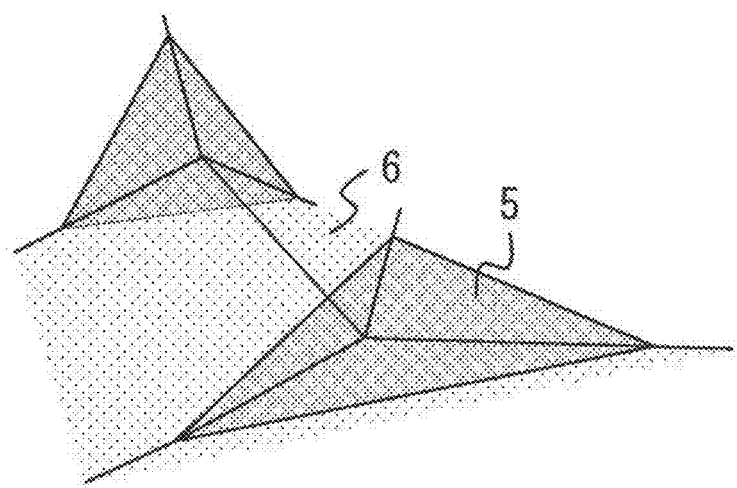

<Example 1> Pore Structure of Highly Dense Aggregate Film Using PZT Particles Next, a specific manufacturing method of the structural member of the present invention is explained.

PZT particles (average particle size: 1550 nm) serving as the first particles were attached on a surface of stainless-steel SUS 304 substrate (thickness of 20 μm).

The first PZT particles were synthesized with a molten salt method using PZT-LQ powder manufactured by SAKAI CHEMICAL INDUSTRY CO., LTD. The first PZT particles were weighted with a micro-analytical balance (SHIMADZU, Model: AEM-5200) and were transferred into a 50 cc glass vessel added with ethanol, and a dispersion treatment was carried out with ultrasonic waves of 350 W and 20 kHz using an ultrasonic homogenizer (manufactured by SONIC & MATERIALS, model: VCX750) for one minute. The dispersion was transferred into an air-brush painting system (manufactured by GSI Creos Corporation, PS311 Air Brush Set) and was sprayed onto a SUS 304 substrate of a transfer plate prepared on a hot plate set at 60° C. in advance so that the first PZT particles were attached onto the surface of the SUS 304 substrate.

Next, second particles were attached onto the first particles so that the mixing ratio of the second particles (volume occupied by the second particles/volume of the summation of the first particles and the second particles) fell within 15% to 30%.

The spray painting of the second particles was the same as that of the first particles. PZT particles (average particle diameter: 150 nm) were used as the second particles. The second particles were obtained as follows: a sintered body was first prepared using PZT-LQ powder of SAKAI CHEMICAL INDUSTRY CO., LTD, the sintered body was transformed into a powder with a mortar, the powder was added into a zirconia ball mill pot together with zirconia balls and acetone and crushed by a planetary ball mill, the powder obtained by evaporating acetone was dispersed in ethanol and was treated in a centrifuge, and then a classification treatment was carried out. Similar to the first PZT particles, the second PZT particles were also attached onto the first PZT particles by dispersing the second PZT particles in ethanol and then spraying this dispersion on a surface of the SUS 304 substrate on which the first PZT particles have been attached.

The SUS 304 substrate on which the first and second particles were attached was retrieved from the hot plate and was cut into a plurality of 1 cm$^2$ circular plates, the first and second particles were pressed against a base material of an aluminum foil (thickness of 20 μm), and the pressure transfer was performed to fix the first and second particles onto the base material.

The base material is preferred to be a metal with an elastic modulus of 180 GPa or lower or carbon. The fixing pressure is preferred to be lower than a pressure under which the raw-material particles are crushed and to be 2 GPa or lower. In this experiment, the pressing was carried out under two pressures of 1000 MPa and 400 MPa. The pressure transfer of the first and second particles onto the aluminum foil base material from the SUS 304 substrate was repeated nine times, by which a highly dense aggregate film (pressed at 1000 MPa) and a pressed powder film of PZT (pressed at 400 MPa) were stacked over the aluminum foils.

As a comparable reference example, a sintered body was obtained by sintering PZT-LQ powder manufactured by SAKAI CHEMICAL INDUSTRY CO., LTD so as to realize a relative density of approximately 80%.

Specific surface areas were evaluated with the multipoint BET method (Kr gas absorption method) for the obtained highly dense aggregate film, the pressed powder film, and the poorly dense sintered body. The results are summarized in Table 1.

As a true density of PZT, a value of 8.0 g/cm$^3$ was used. The specific surface area in the form of powder was calculated by approximating the powder to a sphere having a diameter of the average particle diameter of the first and second PZT particles. The size of the particles of the sintered body was an average diameter of the particles bonded to each other as observed after sintering, and the specific surface area in the form of powder was calculated from a particle diameter on an assumption that the powder still exists as powder. In each case, the PZT particles themselves were assumed to be non-porous.

The weights of the PZT layers of the highly dense aggregate film and the pressed powder film were obtained by measuring the weights before and after the first and second PZT particles were deposited on the aluminum foils and then by calculating the difference therebetween. The film thicknesses of the highly dense aggregate film and the pressed powder film were obtained by observing cross-sectional SEM images followed by obtaining the average values of the film thicknesses. From these results, the densities of the highly dense aggregate film and the pressed powder film were calculated and then divided by the true density of PZT to calculate the relative densities (%) of the PZT layers, whereas the porosity (%) of all of the PZT layers was calculated by subtracting the relative density from 100.

The specific surface areas of the PZT layers were evaluated with the BET method while the PZT film are deposited on the aluminum foils. Since the specific area of the aluminum foil is negligibly smaller than the specific surface areas of the PZT layers, only the specific areas of the PZT layers were calculated from the weight of the deposited PZT film by converting the specific surface area value of the whole of the PZT film including the aluminum foil per weight, which was obtained by the BET method, to a value of the PZT layers included in the PZT film per weight.

Since a specific surface area measured by the BET method is a surface area of a range to which Kr serving as a measurement gas can reach from an apparent outer surface of an object sample to be measured, the specific surface area of the PZT layers obtained with the BET method corresponds to a value obtained by subtracting, from the specific surface area of the powder, the specific surface areas of the interfaces formed by the bonding of the powder at the time when the PZT layers are formed from the powder and the specific surface area corresponding to the porous portions which are the pores formed by this process and confined in the PZT layers.

Here, since the shapes of the pores are generally uniform in each of the highly dense aggregate film, the pressed powder film, and the low-density sintered body, the ratio of the specific surface area of the PZT layers obtained with the BET method with respect to the specific surface area in the form of powder can be approximated to a proportion of the pores of the portions communicating with the apparent outer surface of the PZT layers with respect to all of the pores included in the PZT layers.

<Table 1> facing the pores confined inside by the bonding between the particles are only 2% of the whole of the specific areas of the particles. Thus, the highly dense PZT aggregate film has a characteristic whereby the specific area thereof is almost the same as that of the powder even if the highly dense PZT aggregate film is densified so that the porosity reaches 10%.

The specific surface area of the comparable reference example was 0.43 $m^2/g$, while the porosity was 21.8%. The volume density of the pores communicating with the apparent outer surface with respect to all of the pores was 42.8%

As described above, the highly dense PZT aggregate film according to the present invention is a highly dense film having a porosity of 20% or less which is unattainable without the sintering treatment or crushing the particles and exhibits an extremely unique characteristic whereby the large specific surface area comparable to the specific surface area of the particles before aggregation can be maintained even after the aggregation.

Next, the fine structures of the highly dense PZT aggregate film and the PZT sintered body were studied in detail through three-dimensional SEM observation.

TABLE 1

| | PZT highly dense aggregate film | PZT pressed powder film | PZT poorly dense sintered body |
|---|---|---|---|
| Preparation conditions, shapes, and density | | | |
| (1) Preparation conditions | 1000 MPa press | 400 MPa press | sintering treatment |
| (2) True density of PZT (g/cm³) | | 8.0 | |
| (3) Particle diameter of first particles (nm) | 1550 | | 750 (after sintering) |
| (4) Particle diameter of second particles (nm) | 150 | | — |
| (5) Mixing ratio (first particles: econd particles) | 81.7:18.3 | | — |
| (6) Specific surface area in the form of powder (m²/g) | 1.313 | | 1.0000 |
| (7) Weight of PZT layers (mg) | 8.063 | 7.318 | 315.7 |
| (8) Average thickness of PZT layers (μm) | 11.20 | 13.75 | 1734 |
| (9) Area (cm²) | 1.0 | 1.0 | 0.291 |
| (10) Density of PZT layers (g/cm³) | 7.20 | 5.32 | 6.258 |
| (11) Relative density of PZT layers (%) | 90.0 | 66.5 | 78.2 |
| (12) Whole porosity | 10.0 | 33.5 | 21.8 |
| BET evaluation (Kr gas absorption method, multipoint method) | | | |
| (13) Weight of the whole of sample (g) | 0.0297 | 0.0307 | 0.3157 |
| (14) Weight of PZT layers (mg) | 16.001 | 16.358 | 0.3157 |
| (15) Measurement results of specific surface area (m²/g) (including aluminum foil) | 0.6973 | 0.6864 | 0.4279 |
| (16) Specific surface area of PZT layers (m³/g) | 1.29 | 1.29 | |
| (17) Specific surface area of PZT layers (m²/cm³) | 9.32 | 8.86 | 2.68 |
| (18) Volume density of porous portions continuing to outer surface with respect to all pores (5) [(16)/(6)]*¹ | 98.6 | 98.1 | 42.8 |

The PZT film prepared by applying a pressure of 400 MPa exhibited a porosity of 33.5% similar to that of the normally pressed powder, while the PZT film obtained by applying a pressure of 1000 MPa was highly densified and showed a porosity of 10%. The specific surface areas of the PZT layers of the pressed PZT powder film and the highly dense PZT aggregate film were each 1.29 $m^2/g$, revealing that the volume density of the pores communicating with the apparent outer surface with respect to all of the pores is 98% or more. Furthermore, comparison of the specific surface area in the form of powder in (6) in Table 1 with the specific surface area of the PZT layers of (16) in Table 1 means that the contacting areas between the PZT particles in the highly dense PZT aggregate film and the areas of the portions of the particles The highly dense PZT aggregate film was prepared similarly to the sample used in the BET evaluation. The pressing pressure was 750 MPa, and the porosity of the aggregate film was 14%. As a comparable reference example, a sintered body with a porosity of 4% was prepared.

Three-dimensional SEM images can be reproduced as a three-dimensional CG by obtaining a plane image of a surface and then by repeatedly thinly shaving the observed surface with FIB (the thickness was 50 nm in the case of the highly dense aggregate film, while the thickness was 100 nm in the case of the sintered body) and obtaining a plane image again, followed by digitally treating a huge amount of obtained image data, by which the fine structures and the like can be numerically analyzed. The experimental conditions and the results are summarized in Table 2.

Figure 2A:
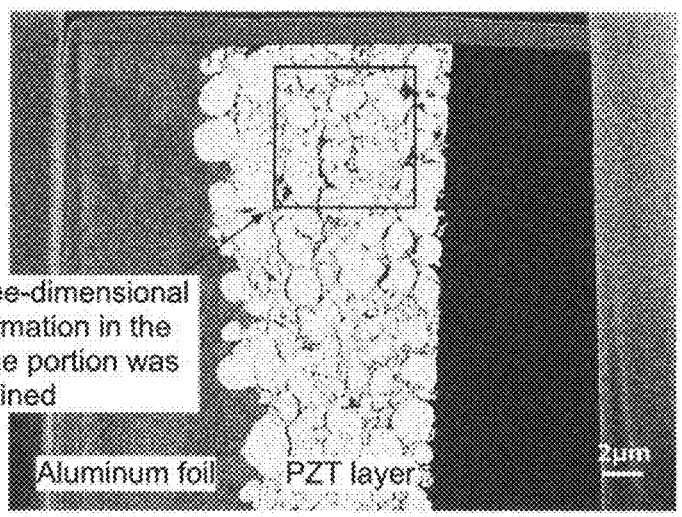
FIG. 2A to FIG. 2E are three-dimensional SEM images of the highly dense PZT aggregate film according to the present invention.
Figure 2B:
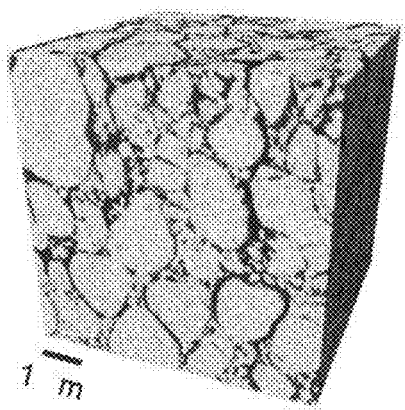
Figure 2C:
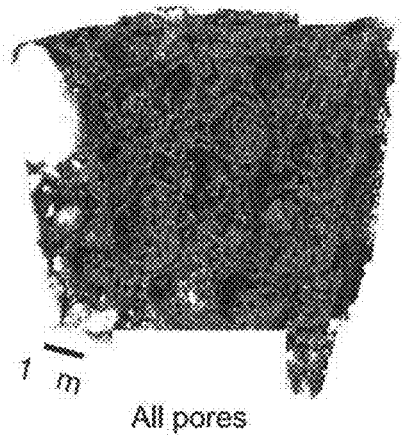
Figure 2D:
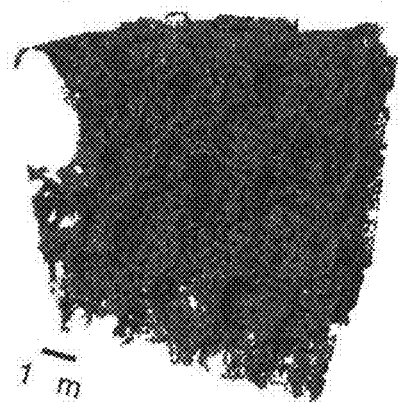
Figure 2E:
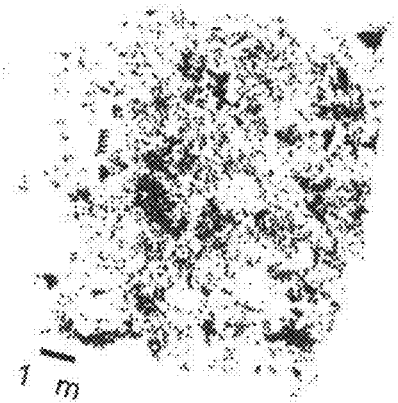
Figure 3A:
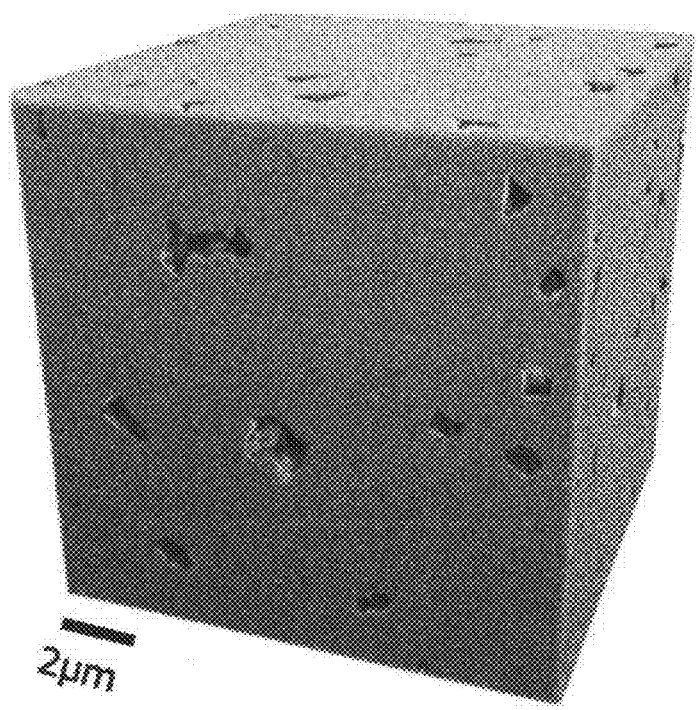
FIG. 3A and FIG. 3B are three-dimensional SEM images of a typical PZT sintered body.
Figure 3B:
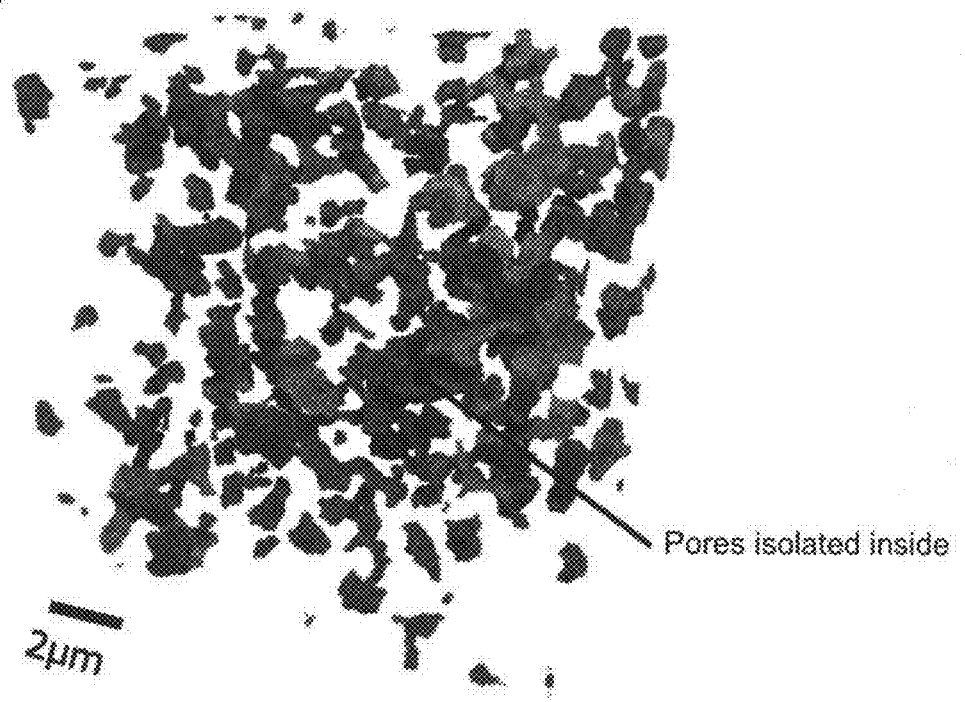

A cross-sectional SEM image of the highly dense PZT aggregate film used for the three-dimensional SEM observation is shown in FIG. 2A. In the three-dimensional SEM observation, a region surrounded by a rectangle (7 μm×7 μm) in the cross-sectional image was observed to a depth of 7 μm. A three-dimensional image reproducing the fine structure of the highly dense PZT aggregate film is shown in FIG. 2B, a three-dimensional image of the pore structure of the whole of the observed region is shown in FIG. 2C, a three-dimensional image of the pore portion having the maximum volume among all of the pores communicating with each other, and also communicating with the outer surface of the observed region is shown in FIG. 2D, and a three-dimensional image of the isolated pore portion other than the pores communicating with the outer surface, which is confined in the observed region, is shown in FIG. 2E. FIG. 3A shows a three-dimensional image reproducing the fine structure of the sintered body, whereas FIG. 3B depicts a three-dimensional image of the pore structure of the whole of the observed region. The black portions in FIG. 3B are the pore portions communicating with the outer surface of the observed region, while the gray portions are the pore portions isolated inside.

From FIG. 2A, it can be confirmed that the highly dense PZT aggregate film deposited at 750 MPa is uniform and has a high density. It can be confirmed from FIG. 2C and FIG. 2D that the pore structure of the highly dense PZT aggregate spreads entirely in the observed region in a mesh form and that almost all of the pores are integrated, and it can be confirmed from FIG. 2E that there are few pores isolated inside. On the other hand, it can be confirmed that the pore structure of the sintered body of FIG. 3B is dotted from a grain-boundary triple-point as a starting point and that the pores scarcely communicate with one another.

The observation results of the fine structures obtained from the three-dimensional SEM do not contradict the aforementioned fine structures of the highly dense PZT aggregate and the PZT sintered body derived from the BET specific surface areas obtained with the multipoint BET method, which proves that the aforementioned investigation using the BET specific surface areas is reasonable.

Moreover, on the basis of this fact, the specific surface area of the pore portions communicating with the outer surface of the highly dense PZT aggregate film which was prepared at a press pressure of 750 MPa and which was used for the aforementioned three-dimensional SEM analysis can be estimated to be 11.23 $\mu m^2/\mu m^3$ from the particle diameter size of the raw-material particles, the specific surface area of the raw-material particles calculated from the mixing ratio (73.8:26.2), and the volume density (98%) of the pore portions communicating with the outer surface with respect to all of the pores analyzed using the three-dimensional SEM images.

<Table 2>

TABLE 2

| | PZT highly dense aggregate film | PZT sintered body |
|---|---|---|
| Measurement area: vertical (μm) | 7 | 14 |
| Measurement area: lateral (μm) | 7.0 | 14.0 |
| Measurement area: depth (μm) | 7 | 14 |

TABLE 2-continued

| | PZT highly dense aggregate film | PZT sintered body |
|---|---|---|
| Measurement area: volume (μm$^3$) | 343 | 2744 |
| Volume of pores communicating with outer surface (μm$^3$) | 48.38 | 108.22 |
| Maximum pore volume (μm$^3$) | 47.58 | 7.91 |
| Porosity (%) | 14 | 4 |
| Relative density (%) | 86 | 96 |
| Volume density of pore portion communicating with outer surface with respect to volume of all of the pores (%) (volume of pores communicating with outer surface/all of the pores × 100 | 98.30 | 7.3 |

A relationship between the volume density of the pores communicating with the outer surface with respect to all of the pores and the entire porosity, which was derived from the results of the multipoint BET method and the observation of the three-dimensional SEM images described above, is shown in FIG. 4.

Figure 4:
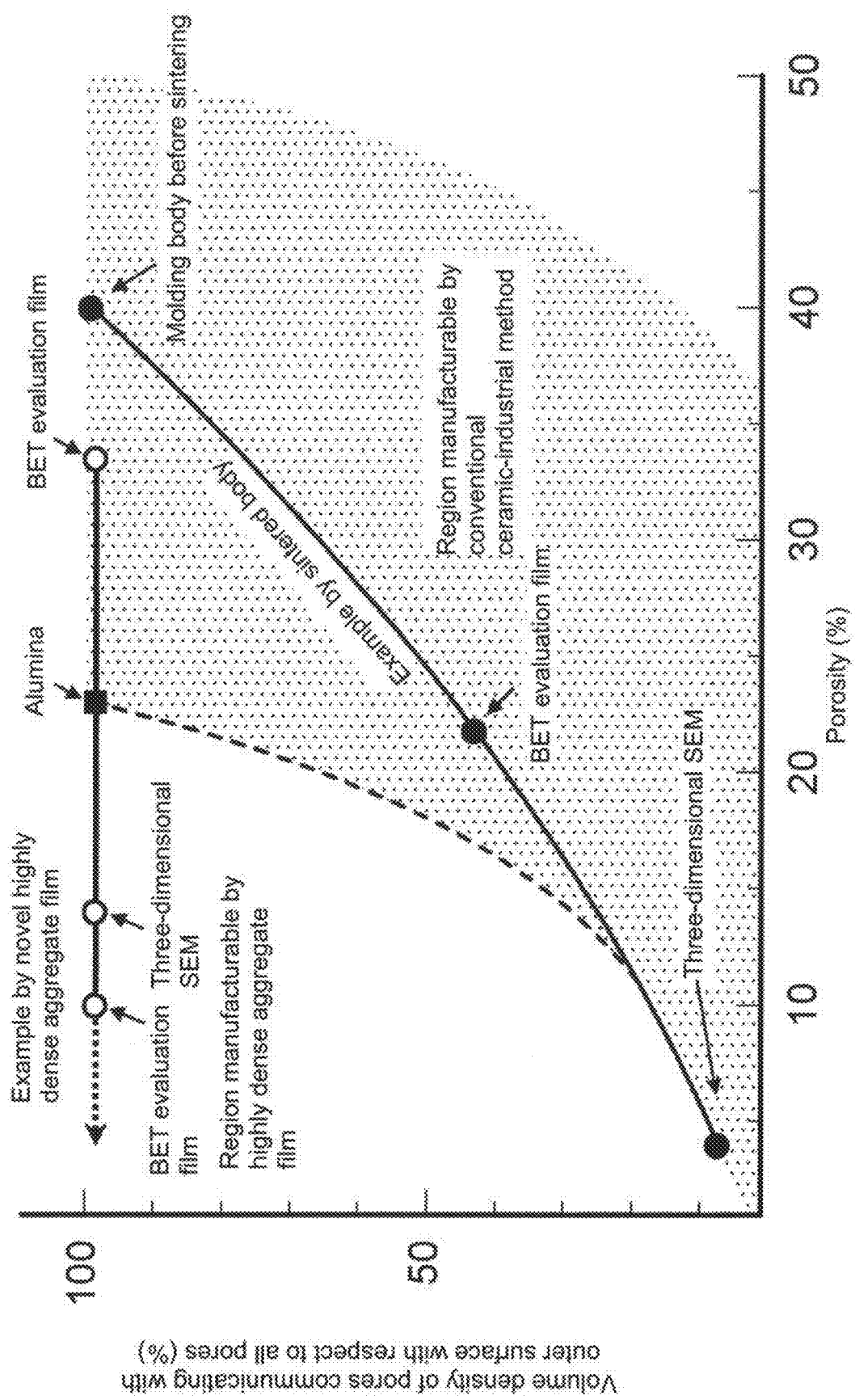
FIG. 4 is a drawing showing a difference in the relationship of the volume density of the pores communicating to an outer surface with respect to all of the pores against the porosity between the ceramics manufacturable by the traditional ceramic-industrial method and the ceramics manufacturable using the highly dense aggregate.

Three white-background circles on the solid line at the top of FIG. 4 are the plots of the PZT aggregates respectively prepared with the manufacturing method of the aggregate used in the present invention at the fixing pressures of 400 MPa, 750 MPa, and 1000 MPa from the right. The left two circles exhibit the porosity of 20% or less and correspond to the highly dense aggregate of the present invention, while the right one is the pressed powder having the porosity of 33.5% and is excluded from the scope of the present invention. These aggregates and the pressed powder each have the specific surface areas of the pore portions communicating with the outer surface, which are the same as the specific surface area of the raw-material powder.

The lower solid line in FIG. 4 shows the relationship between the volume density of the pores communicating with the outer surface of the PZT sintered body with respect to all of the pores and the entire porosity, where the right, center, and left black circles are respectively the plots of the molding body before sintering (non-pressed), the sintered body obtained in the present example and having a porosity of 21.8%, and a sintered body having a porosity of 4%.

As shown here, in the sintered body, the crystal growth of the raw-material particles by sintering decreases the porosity, which leads to a decrease in the volume density of the pores communicating with the outer surface with respect to all of the pores.

The center dotted line in FIG. 4 shows a relationship between the volume density of the pores communicating with the outer surface with respect to all of the pores and the entire porosity of a molding body of alumina particles obtained by the normal one-step compression in a range in which crushing the raw-material particles is suppressed as much as possible regardless of the manufacturing method of the aggregate of the present invention.

The black rectangle on the dotted line is a plot of alumina described in the Japanese Patent Application Publication No. 2018-110527 and Uchida, Y. et al., Sumitomo Kagaku, 2000-I, p. 45 as a molding body, which is obtained by the normal one-step compression and has been conventionally known to have the minimum porosity, in a range in which crushing of the raw-material particles is suppressed as much as possible and is plotted on the solid line on the top of FIG. 4 assuming that the volume density of the pores communicating with the outer surface with respect to all of the pores is the same as that of the pressed powder on the top of FIG. 4 considering that the alumina is pressed powder.

It is considered to be possible to further reduce the porosity by performing sintering or molding as well as crushing the raw-material particles. However, crystal growth or crushing the raw-material particles by this process results in a decrease in the volume density of the pores communicating with the outer surface with respect to all of the pores as demonstrated by the dotted line.

The plots of the PZT sintered body and alumina reveals that, in the traditional ceramic-industrial method involving a heat treatment and crushing of raw-material particles, the maximum pore density tends to decrease because the decrease in porosity scatters the pores integrated in the pressed powder.

On the other hand, the highly dense aggregate according to the present invention is capable of maintaining almost 100% volume density of the pores communicating with the outer surface with respect to all of the pores, which is the same as a general pellet molding body prior to sintering, even in the case where the porosity is 20% or less because crushing the raw-material particles is suppressed as much as possible and no crystal growth occurs.

From the plots of alumina and the curve of the PZT sintered body, it is possible to show a limit region of the porosity and the volume density of the pores communicating with the outer surface with respect to all of the pores according to the traditional technology. Meanwhile, it is apparent that a structural member having porosity of 20% or less and 60 to 65% of volume density of pores communicating with an outer surface with respect to all pores can be manufactured by further sintering or pressing the highly dense aggregate according to the present invention, for example.

The average pore width between the particles of the highly dense aggregate of the present invention is preferred to be 200 nm or less in view of the impregnation with silicone oil, a liquid in which nanoparticles are dispersed, or a liquid resin described below. As described above, the specific surface area of the pore portions communicating with the outer surface of the highly dense PZT aggregate film subjected to the three-dimensional SEM image observation shown in FIG. 4 can be estimated to be 1.23 $\mu m^2/\mu m^3$, whereas the average pore width of the pore portions communicating with the outer surface of the PZT particles in the highly dense PZT aggregate film is 25 nm if approximated with a quotient obtained by dividing the "pore volume (48.3 8 $\mu m^3$)" with the "half of the surface area (11.23 $\mu m^2/\mu m^3 \times 343 \mu m^3/2$)".

Figure 5A:
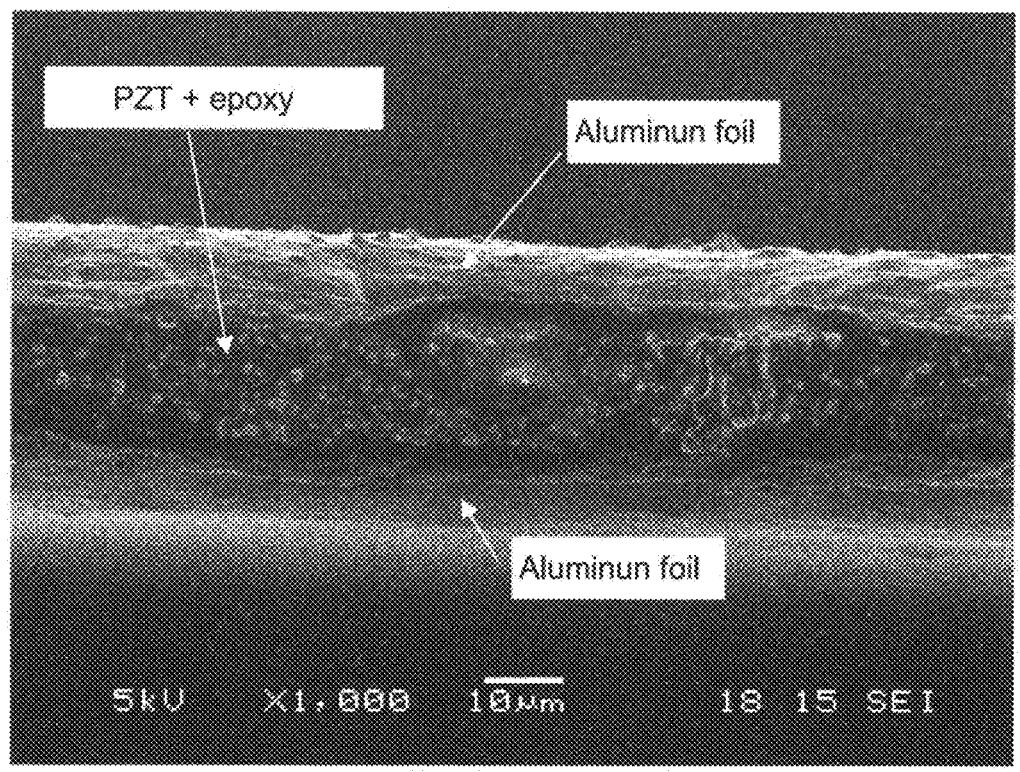
FIG. 5A and FIG. 5B are fractured surface SEM images of the highly dense PZT aggregate film impregnated with an epoxy resin or a PMMA resin.

FIG. 5A is a SEM image of a fractured surface of a film obtained by impregnating an epoxy resin into the highly dense PZT aggregate and then curing the epoxy resin. The highly dense PZT aggregate film deposited on an aluminum foil was cut into circles with diameter of 11.24 mm and 13 mm, one drop of a two-liquid type low-viscosity 50-minute curing type epoxy resin (NISSIN RESIN Co., Ltd.) was dropped on the surfaces of the PZT films, these two highly dense PZT aggregates were arranged to face each other, and the epoxy resin was cured while applying a pressure of 400 MPa.

Figure 5B:
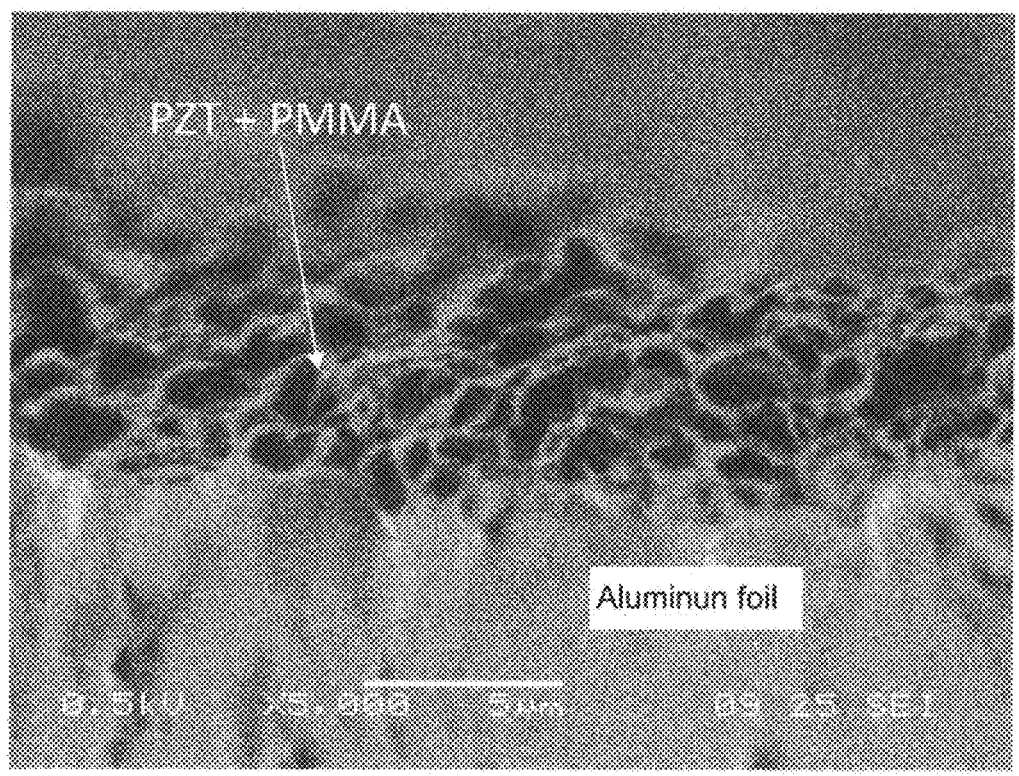

FIG. 5B is a SEM image of a fractured surface of a film obtained by impregnating PMMA into the highly dense PZT aggregate and then precipitating PMMA. PMMA was dissolved in acetone, sprayed onto the first and second PZT particles over a SUS foil, and dried to return PMMA to powder. The amount of the sprayed PMMA was the same as the pore volume generated when the first and second PZT particles are highly densified. After the first and second PZT particles and the PMMA powder over the SUS foil were deposited over an aluminum foil by repeating pressing to fabricate the highly dense aggregate film, and acetone was dropped with a syringe to dissolve the PMMA again and dried to precipitate PMMA again.

Figure 6:
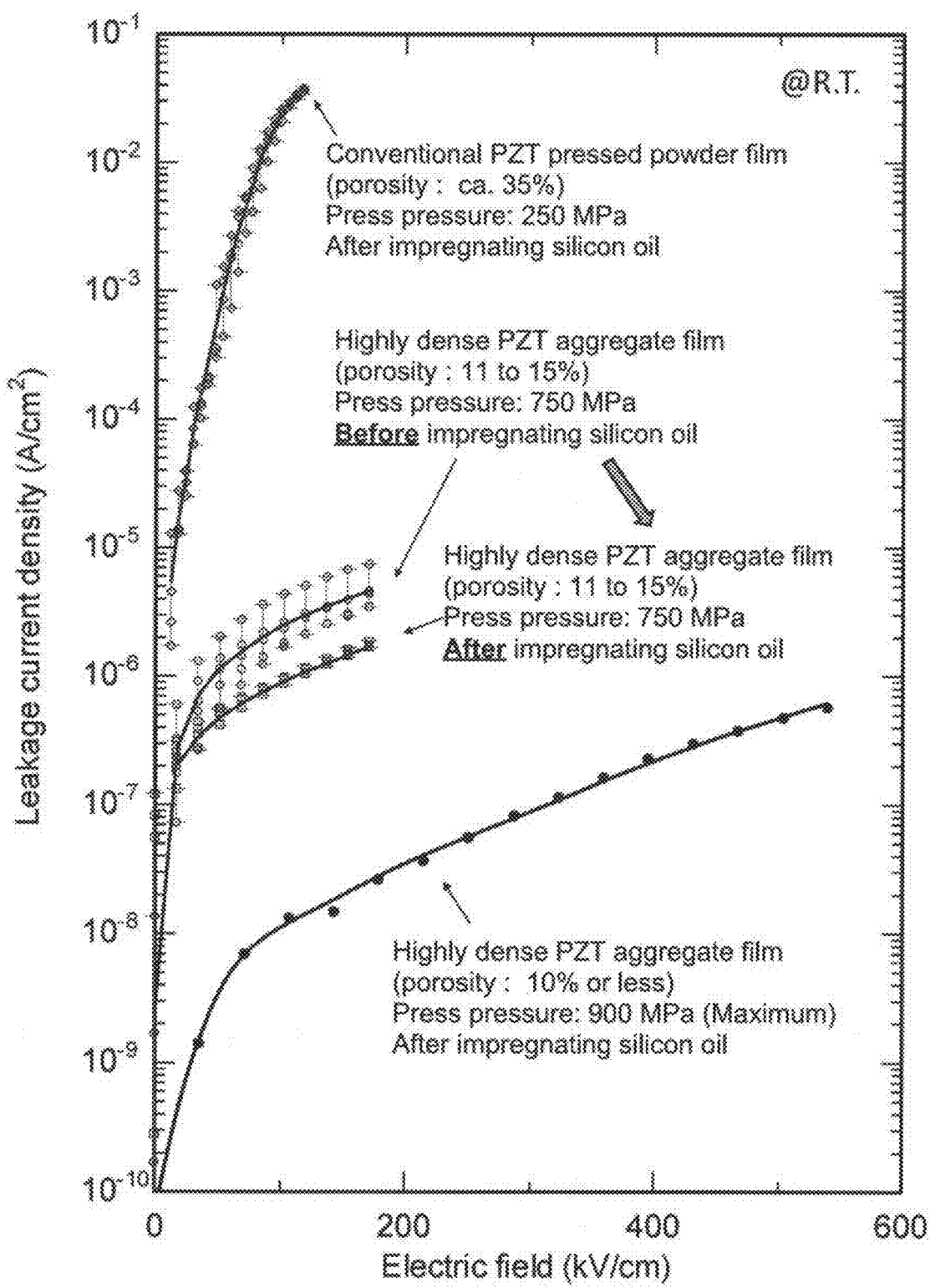
FIG. 6 is a comparable drawing of the leak-current property of the PZT pressed powder film and the highly dense PZT aggregate film.

<Example 2> Physical Properties of Highly Dense Aggregate Film Using PZT Particles Next, a leak-current property and a polarization property of the highly dense aggregate film according to the present invention were studied. In order to evaluate the physical properties, an Au electrode with an area of 0.5 mm×0.5 mm and a thickness of 400 nm was deposited over each PZT surface with a sputtering method. FIG. 6 is a drawing demonstrating: a leak-current property of the PZT pressed powder film impregnated with silicon oil and having a porosity of approximately 35%; variation of the leak-current property between before and after impregnating the highly dense aggregate film with a porosity of 11% to 15% with silicon oil; and the leak-current property of the highly dense PZT aggregate impregnated with silicon oil and having a porosity of approximately 10%.

In the normal pressed powder with a porosity of approximately 35%, breakdown immediately occurred due to the extremely large leak current even if silicon oil is impregnated. On the other hand, in the highly dense PZT aggregate film with a porosity of 11% to 15%, the leak current decreased by approximately four orders of magnitude, and it was also confirmed that the leak current was further reduced by approximately one order of magnitude by impregnating with silicon oil. In addition, the highly dense PZT aggregate film impregnated with silicon oil and having a porosity of approximately 10% or less exhibited an excellent insulating property as proven by the leak current of $4.67 \times 10^{-7}$ A/cm$^2$ even under a highly applied electric field of 500 kV/cm.

Figure 7:
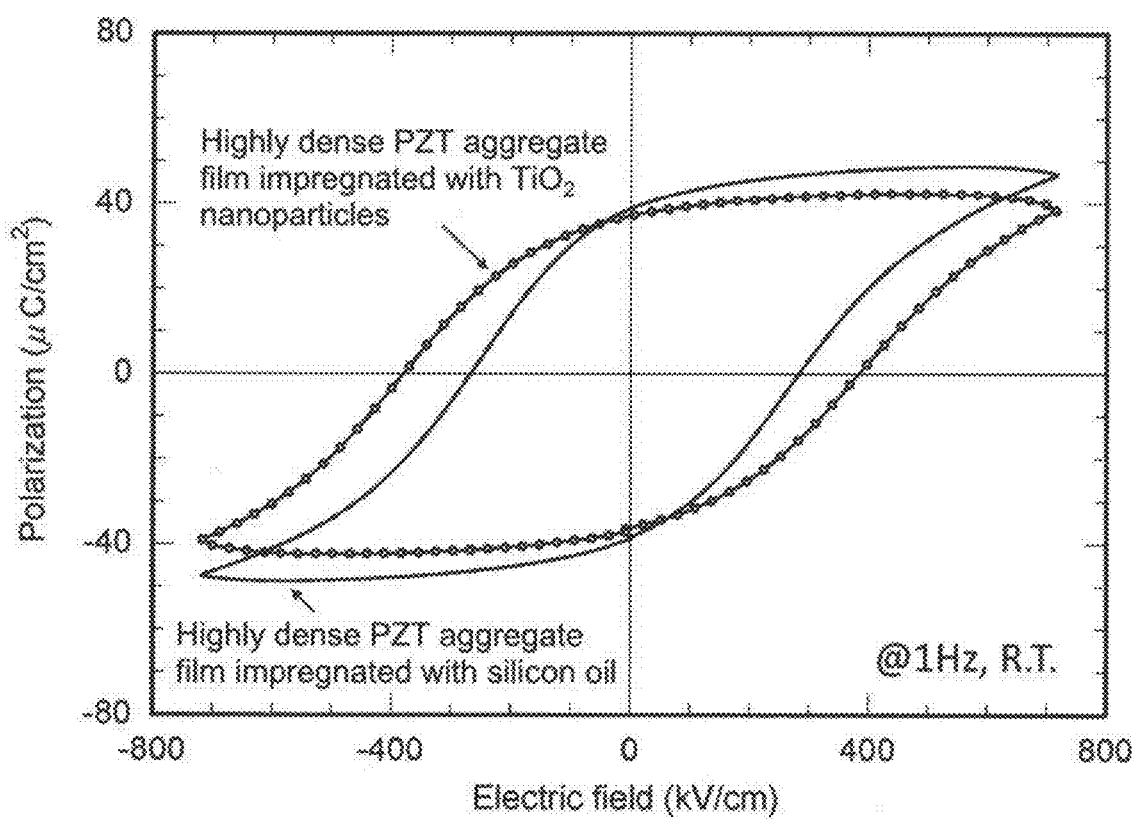
FIG. 7 is a comparable drawing of the polarization property of the highly dense PZT aggregate film including silicon oil and the highly dense PZT aggregate film including $TiO_2$ nanoparticles.

FIG. 7 is a drawing showing the polarization properties of the case where the highly dense PZT aggregate film with a porosity of 10% or less was impregnated with silicon oil and the case where the highly dense PZT aggregate film with a porosity of 10% or less was impregnated with a dispersion in which $TiO_2$ nanoparticles are dispersed in ethanol and then pressed again at 900 MPa.

Both cases show a saturated polarization property, and the highly dense PZT aggregate film impregnated with silicon oil exhibited a residual polarization value ($P_r$) of 38 $\mu C/cm^2$ and an anti-electric field ($E_c$) of 280 kV/cm, while $P_r$ and the anti-electric field ($E_c$) respectively increased to 37 $\mu C/cm^2$ and 400 kV/cm in the highly dense PZT aggregate film impregnated with the dispersion in which $TiO_2$ nanoparticles are dispersed in ethanol.

These results suggest that the functionality of the highly dense PZT aggregate film can be controlled by impregnating nanoparticles, or a resin, or the like.

Figure 8:
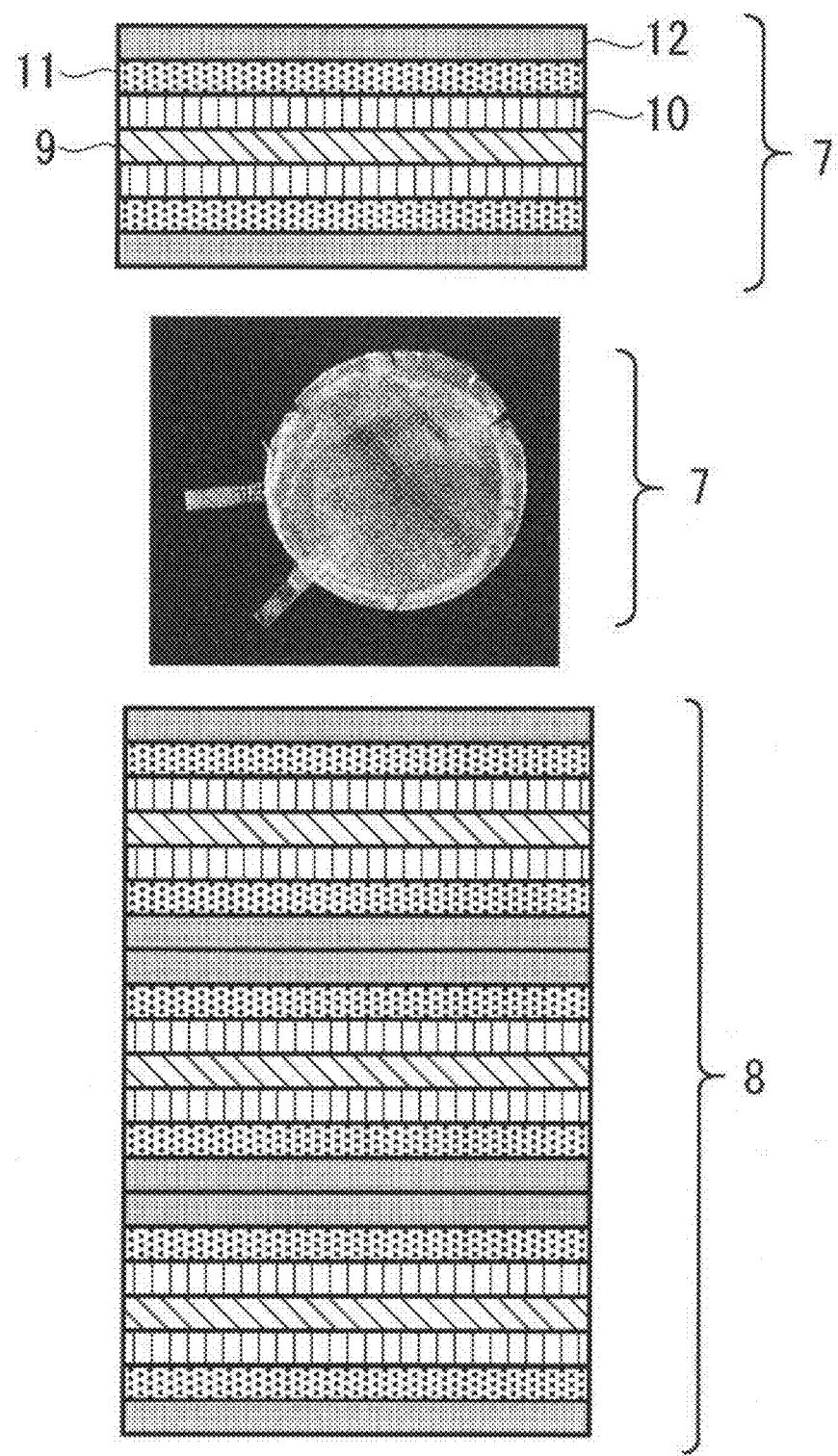
FIG. 8 includes a schematic drawing of the element unit 1 in which the highly dense PZT aggregate film impregnated with PMMA, the electrode layer, and the mesh foil having electric conductivity are stacked on both surfaces of the base material, a photograph showing an appearance of the unit 1, and a schematic drawing of the element unit 2 in which a plurality of units 1 is stacked.

<Example 3> Stack of Highly Dense Aggregate Sandwiched by Electrode Layers (FIG. 8)

(1) Manufacture of Unit 1

The PZT particles (average particle diameter: 1550 nm) serving as the first particles were attached onto a surface of a SUS 304 substrate (thickness of 20 $\mu$m).

The first PZT particles were prepared with a molten salt method using PZT-LQ powder manufactured by SAKAI CHEMICAL INDUSTRY CO., LTD. The first PZT particles were weighted with a micro-analytical balance (SHI- MADZU, Model: AEM-5200) and were transferred into a 50 cc glass vessel added with ethanol, and a dispersion treatment was carried out with ultrasonic waves of 350 W and 20 kHz using an ultrasonic homogenizer (manufactured by SONIC & MATERIALS, model: VCX750) for one minute. The dispersion was transferred into an air-brush painting system (manufactured by GSI Creos Corporation, PS311 Air Brush Set) and was sprayed onto a SUS 304 substrate of a transfer plate prepared on a hot plate set at 60° C. in advance so that the first PZT particles were attached onto the surface of the SUS 304 substrate.

Second particles were attached onto the first particles so that the mixing ratio of the second particles (volume occupied by the second particles/volume of the summation of the first particles and the second particles) fell within 15% to 30%.

The spray painting of the second particles was carried out similar to that of the first particles. PZT particles (average particle diameter: 150 nm) were used as the second particles. The second particles were obtained as follows: a sintered body was first prepared using PZT-LQ powder of SAKAI CHEMICAL INDUSTRY CO., LTD, the sintered body was transformed into powder with a mortar, the powder was added into a zirconia ball mill pot together with zirconia balls and acetone and crushed by a planetary ball mill, the powder obtained by evaporating acetone was dispersed in ethanol and was treated in a centrifuge, and then a classification treatment was performed. Similar to the first PZT particles, the second PZT particles were also attached onto the first PZT particles by dispersing the second PZT particles in ethanol and then spraying this dispersion on a surface of the SUS 304 substrate on which the PZT particles have been attached.

The SUS 304 substrate on which the first and second particles were attached was retrieved from the hot plate and was cut into a plurality of circular plates with a diameter of 13 mm, and a base material of an aluminum foil (thickness of 20 μm) to which an aluminum terminal with a width of 1 mm and a length of 5 mm was attached was sandwiched by the first and second particles attached to the SUS 304 substrates and was applied with a fixing pressure so that the PZT particles were fixed on both surfaces of the base material of the aluminum foil to transfer the first particles and the second particles on both surfaces of the base material.

The base material is preferred to be a metal with an elastic modulus of 180 GPa or lower or carbon. The fixing pressure is preferred to be lower than a pressure under which the raw-material particles are crushed and to be 2 GPa or lower.

In this experiment, after the first and second particles were transferred onto both surfaces of the aluminum foil at 450 MPa eight times, the aluminum foil was pressed at 900 MPa using hard chromium-plated steel to deposit the PZT layers each having a 20 μm thickness on both surfaces of the aluminum foil and exhibiting an insulating property.

A highly dense aggregate film having electric conductivity may be interposed between the base material and the highly dense PZT aggregate film which has insulating properties.

As a comparable reference example, a mesh foil having electrical conductivity was used as a base material, and the transfer of the first and second PZT particles was attempted. The mesh foil having electrical conductivity was prepared by forming, with sputtering, gold electrodes on both surfaces of PET in which holes with a diameter of 250 μmφ were formed with a 300 μm pitch by laser processing.

Figure 9:
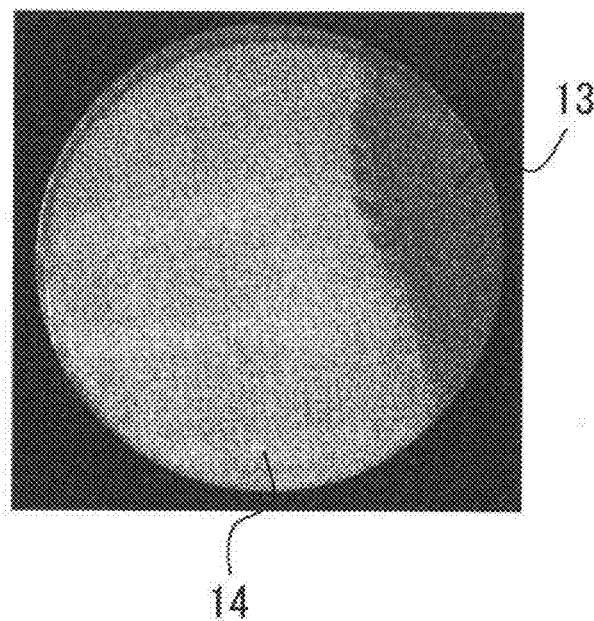
FIG. 9 is a photograph showing an appearance of the highly dense PZT aggregate film manufactured using a mesh foil having electric conductivity as a base material.

A microscopy picture of the obtained aggregate film is shown in FIG. 9. As shown in FIG. 9, the first and second PZT particles were not able to be sufficiently transferred in the hole portions and at the peripheries of the holes of the base material (dark portions dotted in 14), and the first and second particles were not able to be fixed. Note that 13 is a portion in which the aggregate film formed by the transfer was partly wiped in order to indicate that a portion in which the aggregate is not formed is observed as a dark portion.

Next, electrode layers were deposited on the surfaces of the highly dense PZT aggregate films on both sides by depositing gold of 1 cm² with sputtering.

The deposition of these electrode layers is preferably performed with a deposition method which does not close the pores of the highly dense aggregate film because the highly dense PZT aggregate film is impregnated with PMMA in the next process. The method may be a sputtering method or a vacuum evaporation method, and the deposition may be performed by forming a highly dense aggregate film having electrical conductivity.

Both sides of the highly dense PZT aggregate film on which the gold electrodes were formed with sputtering were impregnated with PMMA dissolved in PEGMEA and sandwiched by 1 cm² mesh foils having electrical conductivity to which a terminal with a width of 1 mm and a length of 5 mm was attached, and PEGMEA was vaporized at 60° C. while pressing at 6N/cm² to precipitate PMMA.

In this experiment, the mesh foils having electrical conductivity were prepared by forming, with sputtering, gold electrodes on both surfaces of a PET in which the 25 μmφ holes with a 300 μm pitch were prepared with laser processing. However, the foils are preferred to be a foil prepared by forming similar minute holes in a metal film, cloth woven with yarn having electrical conductivity such as a metal and carbon, or a mesh foil having electrical conductivity manufactured with a 3D printer.

The relative permittivity of the unit 1 obtained by this way was 136.

As a comparable reference example, the electrode layer was not provided, and the mesh foils having electrical conductivity were directly bonded, using PMMA dissolved in PEGMEA, onto the highly dense aggregate films on both surfaces of the base material. The relative permittivity of the obtained unit was 0.67.

These results suggest that close adherence sufficient for an electrode cannot be obtained with respect to the highly dense PZT aggregate when only the mesh foils having electrical conductivity is used.

Figure 10:
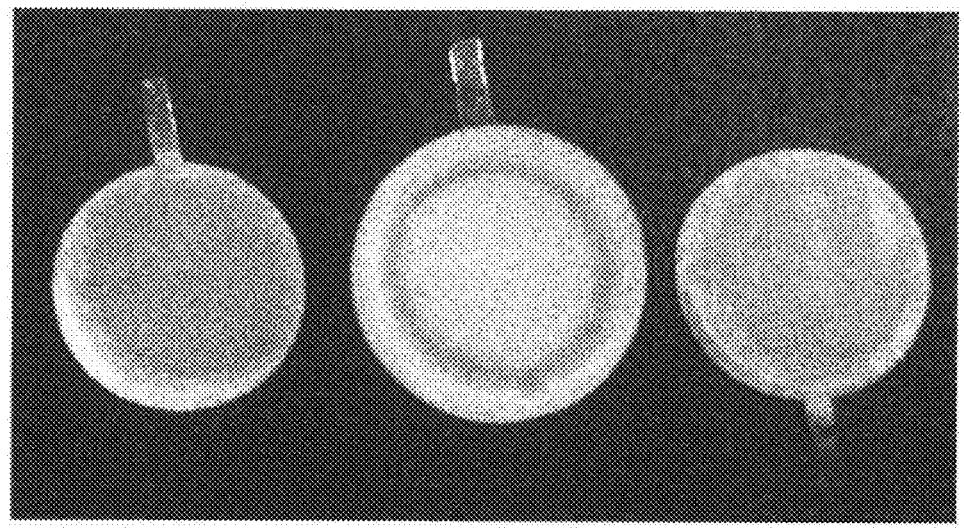
FIG. 10 is a photograph showing that an integrated element unit cannot be obtained when PMMA is not impregnated into the highly dense aggregate films provided on both surfaces of a base material, and when a mesh foil having electric conductivity is directly stacked without any electrode layer.

As a comparable reference example, the mesh foils having electrical conductivity and the highly dense PZT aggregate film were directly contacted without PMMA dissolved in PEGMEA, and a fixing pressure of 1 GPa was applied to attempt bonding. However, as shown in FIG. 10, the bonding was not able to be achieved (the left and right are mesh foils, and the center is the base material provided with the highly dense aggregate films on both surfaces in FIG. 10).

(2) Manufacture of Unit 2

Three elements of the unit 1 manufactured in (1) described above were stacked (unit 2). PMMA dissolved in PEGMEA was impregnated between the units 1, and PEGMEA was evaporated to precipitate PMMA while pressing at 6 N/cm² at 60° C.

With this process, an integrated electrical element unit was prepared in which the units 1 are not required to be held with a pressing tool or the like while stacking the units 1.

<Example 4> Removal of Resin Cured on Surface of Highly Dense Aggregate Film It is extremely difficult to impregnate the press-molded highly dense aggregate film with a resin without any excess and deficiency and to cure the resin in order to expose only the surface of the highly dense aggregate film. For example, when a liquid including a resin such as PMMA dissolved in a solvent is impregnated and then PMMA is precipitated by vaporizing the solvent, there are problems whereby a volume decrease caused by vaporization of the solvent does not allow the precipitated resin to reach the surface of the highly dense aggregate film or whereby application of an excessive amount of liquid results in precipitation of an excessive resin to form a surface layer. In addition, when an epoxy resin or the like is impregnated, there is a problem whereby an attempt to prune the excessive resin overflowing on the surface with silicone rubber or the like prior to curing readily destroys the highly dense aggregate film prepared only by press molding.

For example, when an upper electrode is formed with a sputtering method or the like in a state where the excessive resin on the highly dense aggregate film exhibiting a ferroelectric property is precipitated to form a surface layer, there is a problem whereby the ferroelectric and piezoelectric properties are not exhibited because an electric field is concentrated on the precipitated excessive resin between the upper electrode and the ferroelectric and highly dense aggregate film. Moreover, when the resin is impregnated after the upper electrode is deposited on the highly dense aggregate film in advance and then the resin is precipitated to form the surface layer, a problem arises whereby the precipitated excessive resin in the surface layer inhibits the connection between the upper electrode and a circuit.

The inventors found that there are differences in the dissolving rate into an organic solvent and in the swelling rate when soaked in the organic solvent between the resin which is impregnated in the highly dense aggregate film and then cured and the resin cured on the surface to become the surface layer, and that the manufacturing method can solve the aforementioned problems. Next, a specific manufacturing method is explained using PZT as an example.

PZT particles (average particle diameter: 1550 nm) serving as the first particles were attached on a surface of a stainless SUS 304 base material (thickness of 20 μm).

The first PZT particles were prepared with a molten salt method using PZT-LQ powder manufactured by SAKAI CHEMICAL INDUSTRY CO., LTD. The first PZT particles were weighted with a micro-analytical balance (SHIMADZU, Model: AEM-5200) and were transferred into a 50 cc glass vessel added with ethanol, and a dispersion treatment was carried out with ultrasonic waves of 350 W and 20 kHz using an ultrasonic homogenizer (manufactured by SONIC & MATERIALS, model: VCX750) for one minute. The dispersion was transferred into an air-brush painting system (manufactured by GSI Creos Corporation, PS311 Air Brush Set) and was sprayed onto the SUS 304 base material serving as a transfer plate placed on a hot plate set at 60° C. in advance so that the first PZT particles were attached onto the surface of the SUS 304 base material.

Next, second particles were attached onto the first particles so that the mixing ratio of the second particles (volume occupied by the second particles/volume of the summation of the first particles and the second particles) fell within 15% to 30%.

The spray painting of the second particles was the same as that of the first particles. PZT particles (average particle diameter: 150 nm) were used as the second particles. The second particles were obtained as follows: a sintered body was first prepared using PZT-LQ powder of SAKAI CHEMICAL INDUSTRY CO., LTD, the sintered body was transformed into powder with a mortar, the powder was added into a zirconia ball mill pot together with zirconia balls and acetone and crushed by a planetary ball mill, the powder obtained by evaporating acetone was dispersed in ethanol and was treated in a centrifuge, and then a classification treatment was carried out. Similar to the first PZT particles, the second PZT particles were also attached onto the first PZT particles by dispersing the second PZT particles in ethanol and then spraying this dispersion on a surface of the SUS 304 base material on which the first PZT particles have been attached.

The SUS 304 base material on which the first and second particles were attached was retrieved from the hot plate and was cut into a plurality of 1 $cm^2$ of circular plates, the first and second particles were pressed against a base material of an aluminum foil (thickness of 20 μm), and the pressure transfer was carried out to fix the first and second particles onto the base material.

Figure 11A:
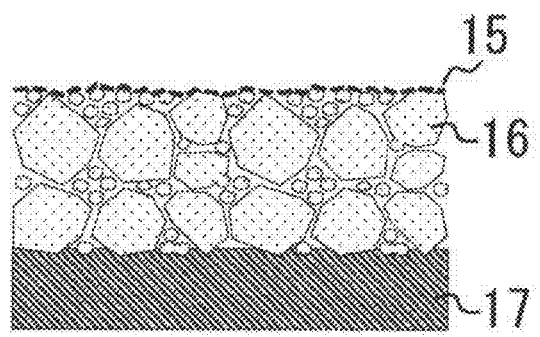
FIG. 11A to FIG. 11E are schematic drawings showing a manufacturing procedure to swell and peel only the crosslinked epoxy resin at the surface layer of the highly dense PZT aggregate film which has been impregnated with the epoxy resin and to expose the electrode layer provided on the surface of the highly dense PZT aggregate film.

The base material is preferred to be a metal with an elastic modulus of 180 GPa or lower or carbon. The fixing pressure is preferred to be lower than a pressure under which the raw-material particles are crushed and to be 2 GPa or lower. In this experiment, pressure of 1000 MPa was applied. The pressure transfer of the first and second particles onto the aluminum base material from the SUS 304 base material was repeated nine times, by which a highly dense PZT aggregate film was stacked over the aluminum foil. FIG. 11A is a schematic drawing of a sample in which an Au upper electrode is formed on a surface of this highly dense PZT aggregate film with a sputtering method. An area of the Au upper electrode was 0.5 mm×0.5 mm, and a thickness was 400 nm.

Figure 11B:
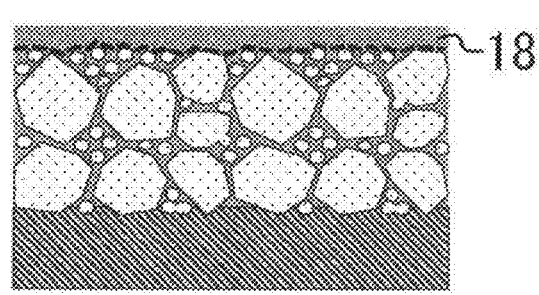

Next, an epoxy resin was impregnated so as to cover the surface as shown in FIG. 11B. A two-liquid type low-viscosity 50-minute curing type epoxy resin (NISSIN RESIN Co., Ltd.) was used. After this impregnating treatment, the epoxy resin was cured by crosslinking the resin with a thermal treatment at 70° C. for 2 hours or more.

Figure 11C:
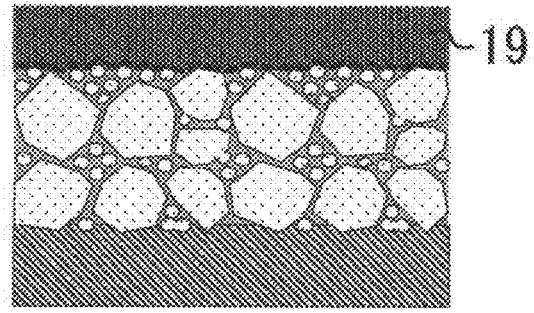
Figure 11D:
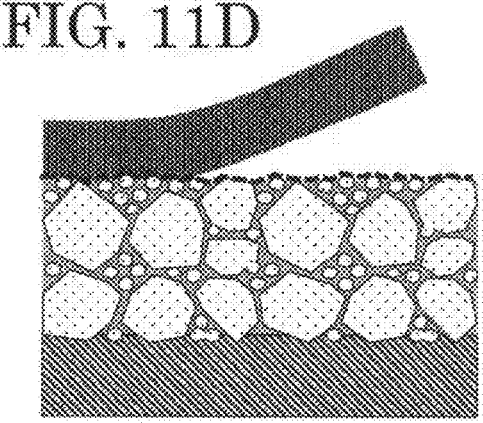
Figure 11E:
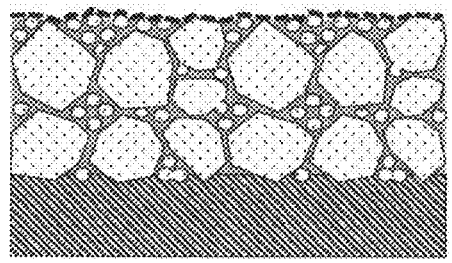

Next, several milliliters of cyclohexane were applied on the sample surface and left to stand for 30 minutes to swell only the excessive epoxy resin of the surface layer as shown in FIG. 11C, and the excessive epoxy resin was carefully peeled with a pair of tweezers as shown in FIG. 11D to expose the highly dense aggregate film and the Au upper electrode as shown in FIG. 11E.

Figure 12A:
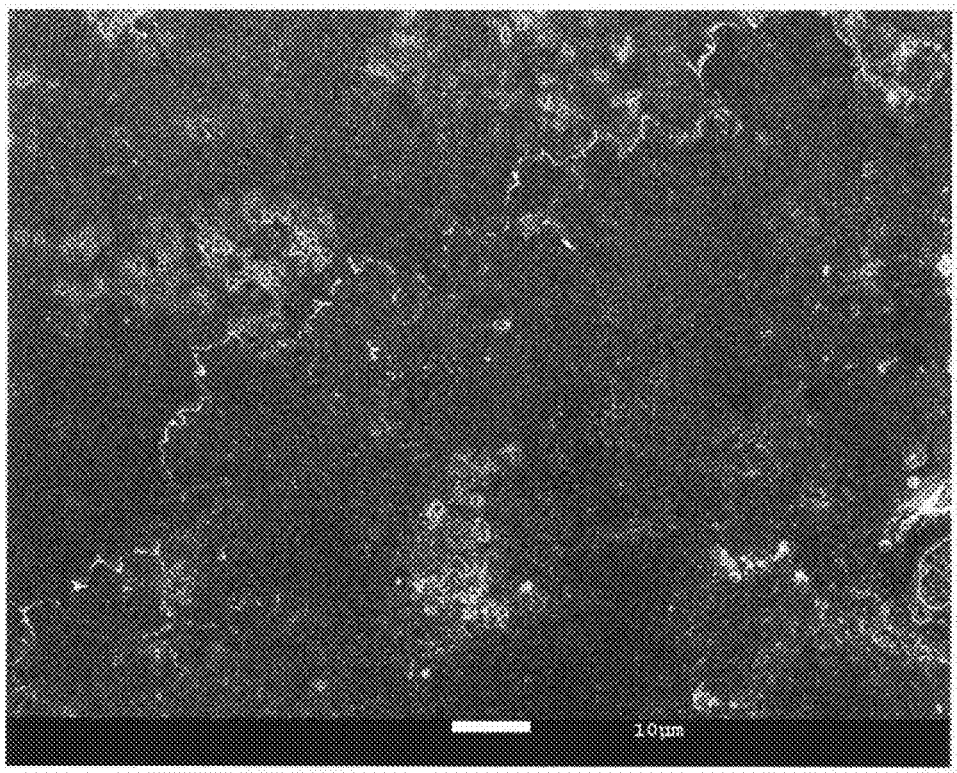
FIG. 12A and FIG. 12B are SEM images to compare the surface of the highly dense PZT aggregate film in which the epoxy resin at the surface layer has been swelled and peeled with the surface of the highly dense PZT aggregate film including the epoxy resin at the surface layer.
Figure 12B:
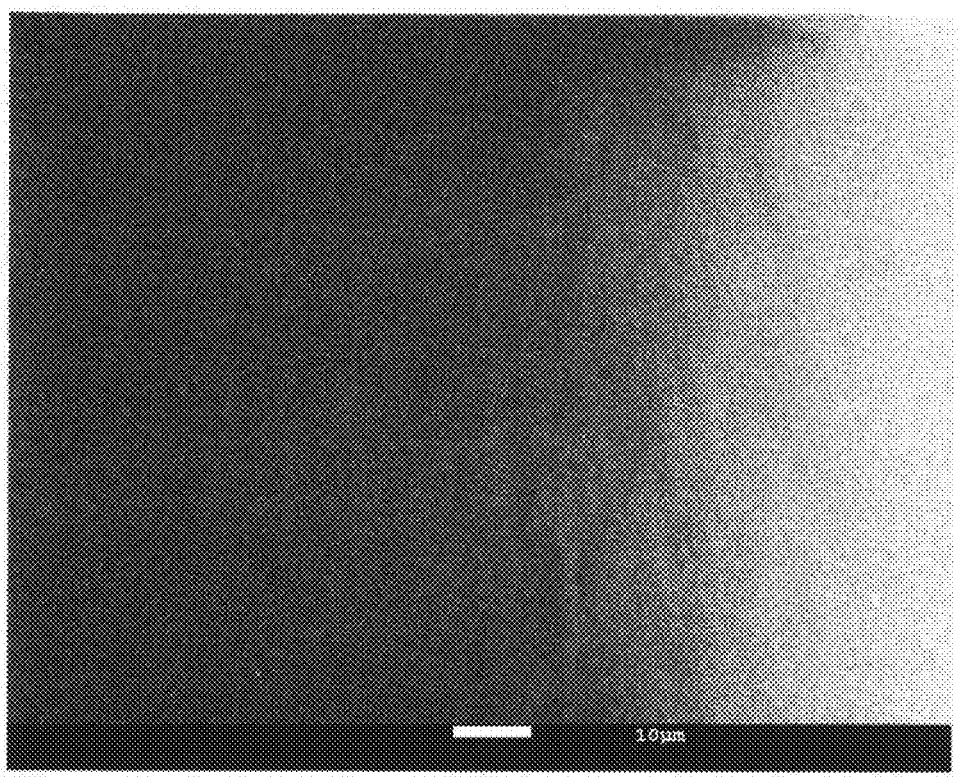

FIG. 12A is a surface SEM image of the Au upper electrode shown in FIG. 11E. As a comparable reference example, a surface SEM image before peeling the excessive epoxy resin depicted in FIG. 11B is shown in FIG. 12B. Although the PZT particles cannot be confirmed with SEM due to the excessive epoxy resin of the surface layer in the comparable reference example, it can be confirmed that the highly dense PZT aggregate film impregnated with the epoxy resin and the Au upper electrode are exposed by the aforementioned swelling treatment with cyclohexane and the peeling.

Although the cured excessive epoxy resin of the surface layer contacts with cyclohexane through a "plane", the epoxy resin impregnating into the highly dense PZT aggregate film hardly swells because cyclohexane reaching the epoxy resin contacts therewith through a "point", which is considered to be a reason why only the epoxy resin of the surface layer can be removed.

Figure 13:
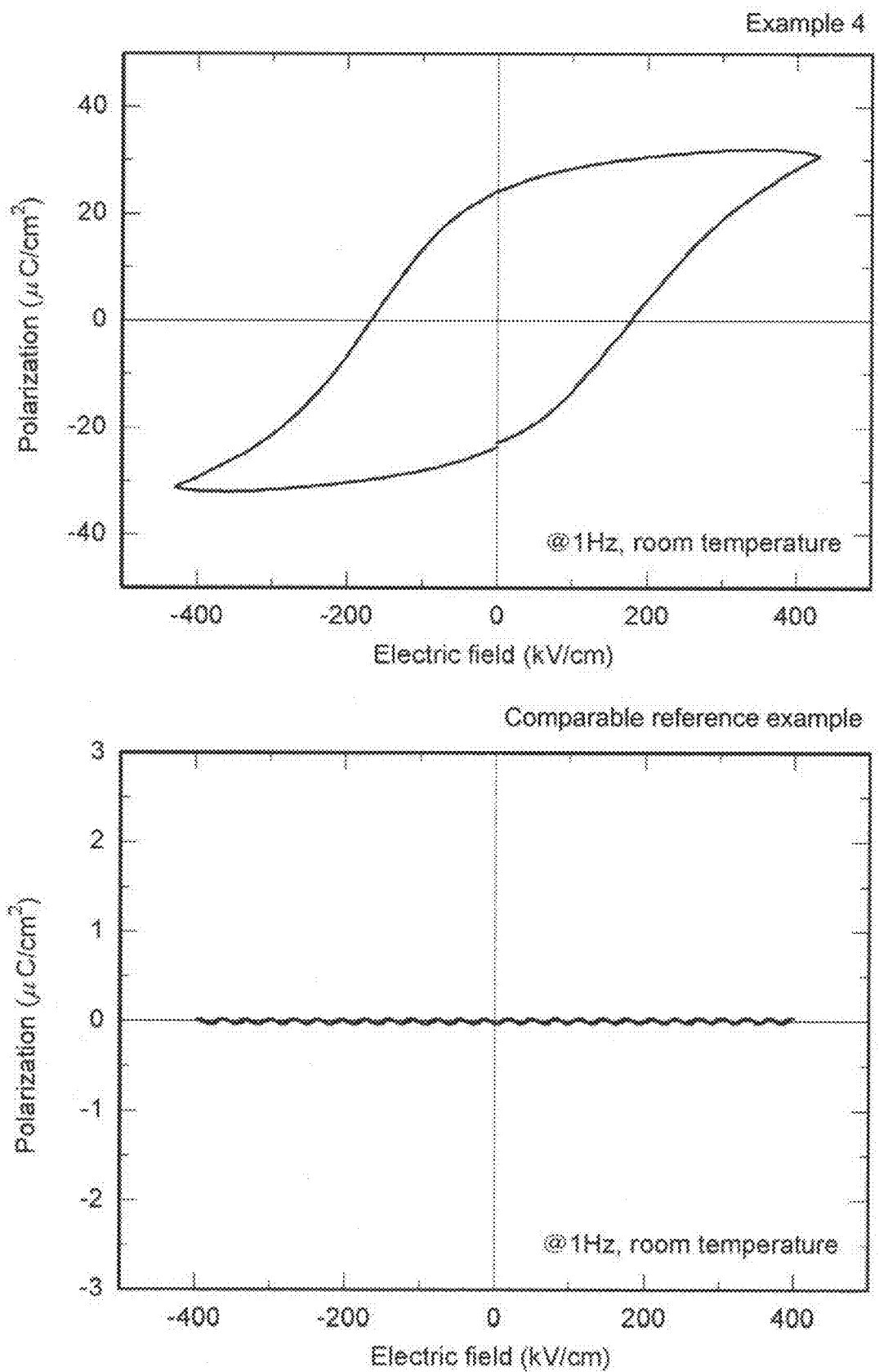
FIG. 13 is a comparable drawing of the polarization properties of the highly dense PZT aggregate film obtained by swelling and peeling the epoxy resin at the surface layer and the highly dense PZT aggregate film including the epoxy resin at the surface layer.

FIG. 13 shows a polarization property of the highly dense PZT aggregate film impregnated with the epoxy resin. A sufficiently saturated hysteresis loop can be confirmed. In the comparable reference example shown in FIG. 13 in which the epoxy resin is left as the surface layer, no hysteresis loop was exhibited because this excessive epoxy resin inhibited a circuit connection between the Au upper electrode and the ferroelectric property evaluating device.

In addition, although a Kapton adhesive tape was put on the surface of the highly dense PZT aggregated film which exhibited the saturated hysteresis loop and was impregnated with the epoxy resin and then peeled off, the highly dense PZT aggregated film did not peel from the aluminum foil of the base material. On the other hand, the highly dense PZT aggregated film impregnated with silicon oil readily peeled from the aluminum foil of the base material.

Thus, the highly dense aggregated film having high bonding intensity and ceramic functionality was fabricated.

<Example 5> Preparation of Sheet-Shaped all-Solid-State Lithium Ion Battery Having Flexibility There is a problem whereby all-solid-state lithium ion batteries using a polymer-based solid-state electrolyte can be charged and discharged only at a temperature equal to or higher than 50° C. because the ion conductivity thereof is lower than that of liquid electrolyte solutions. Moreover, the polymer-based electrolytes also have a problem whereby they are viscous and require a long time for impregnation as well as a problem in increasing energy density by arranging active materials at a high density. It was found that the highly dense aggregate film according to the present invention has a feature where a liquid is impregnated throughout and that diffusing and moving distances of lithium ions can be drastically reduced and an all-solid-state lithium ion battery operable at a room temperature can be prepared by using this structural member in an electrode layer to impregnate a polymer-based solid-state electrolyte.

This all-solid-state lithium ion battery is preferred to include a positive electrode sheet in which a highly dense aggregate film of a positive electrode active material is formed over a base material and a negative electrode sheet in which a negative electrode active material is formed over a base material and is preferred to have a feature where a polymer-based electrolyte is impregnated between this positive electrode sheet and negative electrode sheet. This polymer-based electrolyte may be a non-crosslinked polymer-based electrolyte but is preferred to be a cured polymer-based solid-state electrolyte by crosslinking. Moreover, it is preferred to include a polymer-based electrolyte layer between the highly dense aggregate film of the positive electrode active material and the highly dense aggregate film of the negative electrode active material.

A thickness of the highly dense aggregate film of the positive electrode sheet and a thickness of the highly dense aggregate film of the negative electrode sheet are each preferred to be approximately 3 μm to 50 μm and may be between 1 μm and 300 μm. Moreover, the porosity of the highly dense aggregate film of the positive electrode sheet is preferred to be equal to or less than 20%, whereas the porosity of the highly dense aggregate film of the negative electrode sheet may be equal to or less than 35%.

The positive electrode active material is not limited to the following materials, and lithium cobalate (LOC), lithium manganate, lithium nickelate, nickel-cobalt-manganese oxide, nickel-cobalt-aluminum oxide, lithium iron phosphate, and the like are represented.

The negative electrode active material is not limited to the following materials, and lithium titanate (LTO), carbon, metal silicon, and the like are represented.

The base material of the positive electrode sheet is preferred to be aluminum but is preferred to be a metal coated with corrosion-resistant Au or Pt and having a modulus of 180 GPa or less or carbon. A thickness of the base material of the positive electrode sheet is preferred to be between 10 μm and 30 μm but may be between 5 μm and 50 μm.

The base material of the negative electrode sheet is preferred to be aluminum coated with Au at a thickness of 10 nm to 1 μm but may be a metal coated with Cu or Pt resistant to $Li^+$ and having a modulus of 180 GPa or less or carbon. A thickness of the base material of the negative electrode sheet is preferred to be between 10 μm and 30 μm but may be between 5 μm and 50 μm.

The polymer-based electrolyte layer is preferred to be a non-crosslinked polymer-based electrolyte but is preferred to include a polymer-based solid-state electrolyte cured by crosslinking. In addition, although the higher the ion conductivity of the polymer-based electrolyte layer the better, the ion conductivity of $1 \times 10^{-6}$ S/cm to 1 S/cm is acceptable. A thickness of the polymer-based electrolyte layer is preferred to be from 1 μm to 20 μm but may be between 100 nm and 50 μm.

Next, an example of specific manufacturing methods is explained.

Powder of $LiCoO_2$ (LCO) was used as the positive electrode active material. This powder is commercially available ("CELLSEED 5hV" manufactured by Nippon Chemical Industrial CO., LTD.). Into a 500 cc vessel made of zirconia (manufactured by Fritsch Japan Co., Ltd.) were added 0.5 g of LCO, 50 mL of ethanol, and balls of silicon nitride (total amount of approximately 500 g uniformly including 10 mmφ, 5 mmφ, and 2 mmφ balls), and LCO was crushed with a planetary ball mill (P-6 Classic Line manufactured by Fritsch Japan Co., Ltd.) at 200 rpm for 12 hours.

Figure 14A:
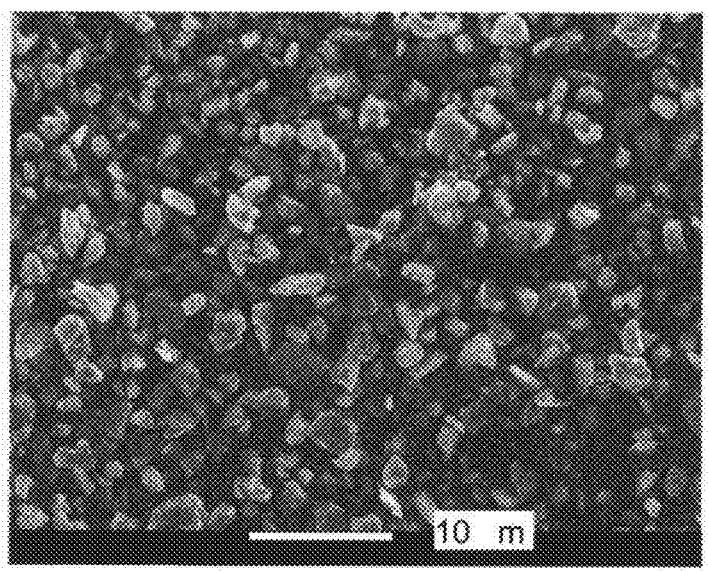
FIG. 14A to FIG. 14C are SEM images of the first LCO particles and the second LCO particles.
Figure 14B:
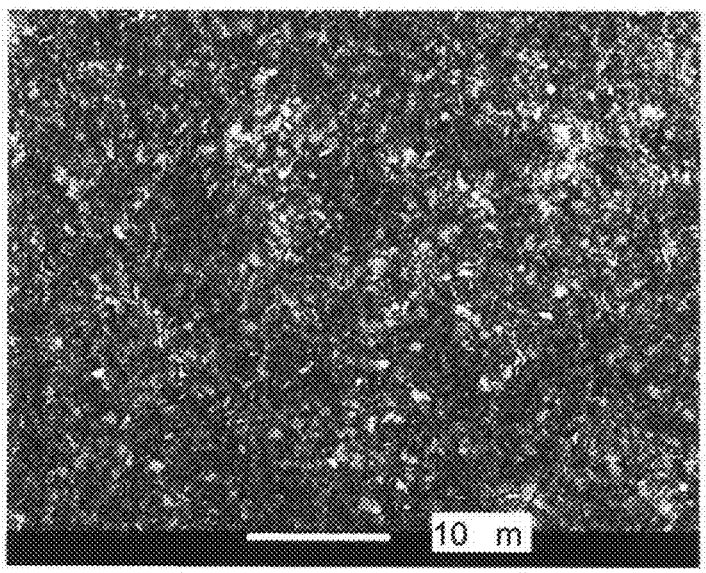
Figure 14C:
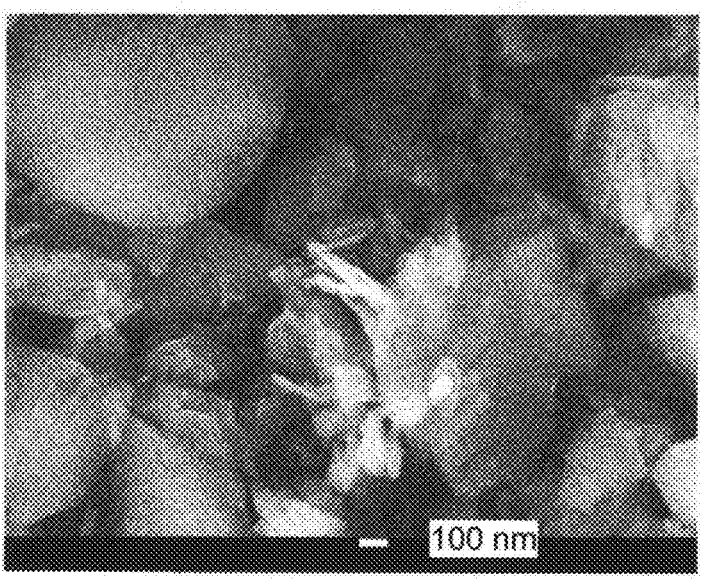

Ethanol was added so that the liquid ejected from the planetary ball mill amounts to 250 mL, and centrifuge was carried out at centrifuge force of 470×g for 5 minutes. A SEM image of the precipitated particles is shown in FIG. 14A. The average particle size was approximately 1 μm. These particles were used as LOC particles. The supernatant left in the centrifuge was evaporated to approximately 70 mL in a vacuum dryer. The obtained liquid was used as a second LOC solution, and the particles obtained by drying the second LOC solution were used as second LOC particles. A SEM image of the second particles is shown in FIG. 14B. It can be confirmed that the second LOC particles were sufficiently crushed compared with the first LOC particles. It was confirmed by subjecting these second LOC particles to SEM observation at higher magnification that nanosheets each having a thickness of several nanometers and a length of approximately several nanometers to 1 μm are included as shown in FIG. 14C.

Next, an alumina-coated SUS 304 foil was prepared by depositing an alumina film having a thickness of approximately 1 μm over a stainless SUS 304 foil (thickness of 20 μm) with an AD method. The LCO particles which will become the first particles were attached onto the alumina film surface. The first LCO particles were weighted with a micro-analytical balance (SHIMADZU, Model: AEM-5200) and transferred to a 50 cc glass vessel to which super-dehydrated heptane was added, a dispersion treatment was carried out with supersonic waves of 150 W and 20 KHz for one minute using an ultrasonic homogenizer (manufactured by SONIC & MATERIALS, model: VCX750), the dispersion was transferred to an air-brush painting system (manufactured by GSI Creos Corporation, PS311 Air Brush Set), the alumina-coated SUS 304 foil of a transfer plate prepared on a hot plate set at 70° C. in advance was spray-painted so that the first LCO particles were attached onto the surface of the alumina-coated SUS 304 foil.

Next, the second LCO particles were attached onto the first LCO particles so that the mixing ratio of the second particles (volume occupied by the second particles/total volume of the first particles and the second particles) fell between 15% and 35%. The second LCO dispersion was used to perform the spray-painting of the LCO second particles. Similar to the first LCO particles, the second LCO particles were attached onto the first LCO particles by spraying the second LCO dispersion on the surface of the alumina-coated SUS 304 foil to which the LCO particles have been attached.

The alumina-coated SUS 304 foil onto which the first and second LCO particles were attached was retrieved from the hot plate and was subjected to a heating treatment at 350° C. under air with the dew-point temperature of −40° C. for 5 minutes.

Next, a base material of a rectangular aluminum foil (area of 6 mm×10 mm, thickness of 12 μm) was prepared. In order to readily and visually confirm that is the positive electrode sheet, an Au film with a 400 nm thickness was formed, with sputtering, on a surface opposite to a surface which fixes the LCO with the rectangular aluminum foil. The first and second LCO particles were pressed against the aluminum surface under air with a dew-point temperature of −40° C., and the pressure transfer was performed to fix the particles onto the base material. The fixing pressure is preferred to be lower than a pressure under which the raw-material particles are crushed and to be 2 GPa or lower. In this experiment, pressure of 420 MPa was applied. The pressure transfer of the first and second particles onto the aluminum foil base material from the alumina-coated SUS 304 foil was repeated four times, by which a highly dense LCO aggregate film was stacked over the aluminum foil. The thickness of the highly dense LCO aggregate film was approximately 5 μm. The positive electrode sheet was obtained by these methods.

Powder of $Li_4Ti_5O_{12}$ (LTO) was used as the negative electrode active material. As this powder, commercially available LTO particles whose surfaces were coated by carbon (LTO-2 manufactured by Xiamen Tmax Battery Equipments Limited) and the powder synthesized from reagents were used.

Figure 15A:
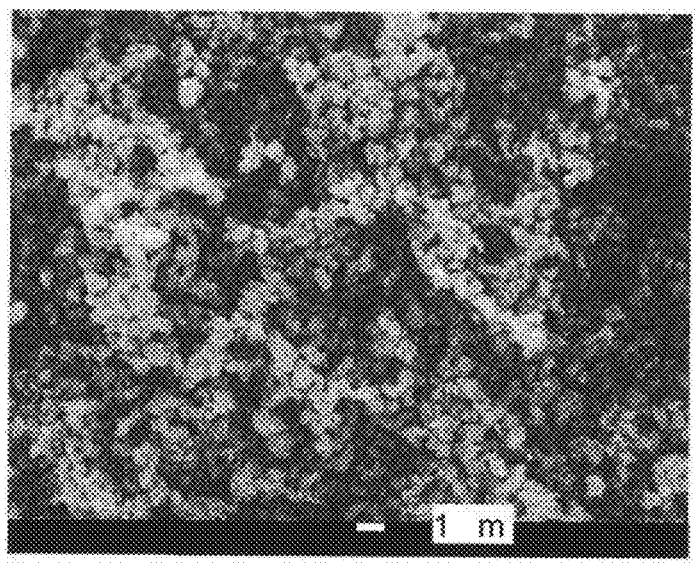
FIG. 15A to FIG. 15C are SEM images of the first LTO particles and the second LTO particles.

First, a dispersion in which 1 g of the commercially available carbon-coated LTO particles were dispersed in 250 ml of ethanol was prepared and was centrifuged at centrifuge force of 75×g, and the liquid was recovered and was sufficiently dried to obtain powder. The particles of this powder were used as the first LTO particles. A SEM image of these particles is shown in FIG. 15A. The average particle size was approximately 800 nm.

Next, lithium carbonate (LIH06XB manufactured by Kojundo Chemical Lab. Co., Ltd.) and titanium oxide (TIO14PB manufactured by Kojundo Chemical Lab. Co., Ltd.) were weighted so as to amount to 20 g of a stoichiometric ratio of $Li_4Ti_5O_{12}$, added to a 500 cc vessel made of zirconia (manufactured by Fritsch Japan Co., Ltd.) together with 200 mL of ethanol and balls of silicon nitride (total amount of approximately 500 g uniformly including 10 mmφ, 5 mmφ, and 2 mmφ balls), and crushed and mixed with a planetary ball mill (P-6 Classic Line manufactured by Fritsch Japan Co., Ltd.) at 500 rpm for 2 hours. After the obtained liquid was transferred to a tray and sufficiently dried at 80° C., the obtained mixed powder was transferred to an alumina crucible, and a thermal treatment was carried out at 800° C. for 6 hours. The obtained powder was added again to a 500 cc vessel made of zirconia (manufactured by Fritsch Japan Co., Ltd.) together with 200 ml of ethanol and balls of silicon nitride (total amount of approximately 500 g uniformly including 10 mm, 5 mm, and 2 mmφ balls), crushed with a planetary ball mill (P-6 Classic Line manufactured by Fritsch Japan Co., Ltd.) at 500 rpm for 2 hours, transferred to a tray, and sufficiently dried at 80° C. to obtain a powder, and the obtained powder was transferred to an alumina crucible and subjected to a thermal treatment at 800° C. for 6 hours to obtain LTO powder.

Figure 15B:
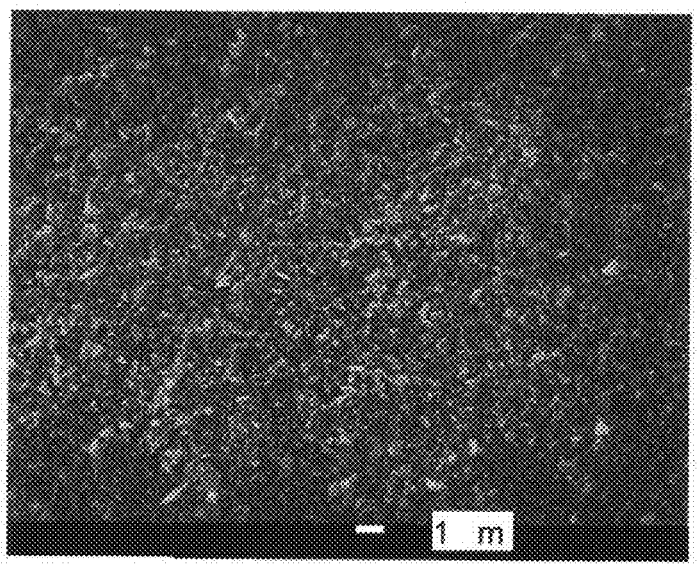
Figure 15C:
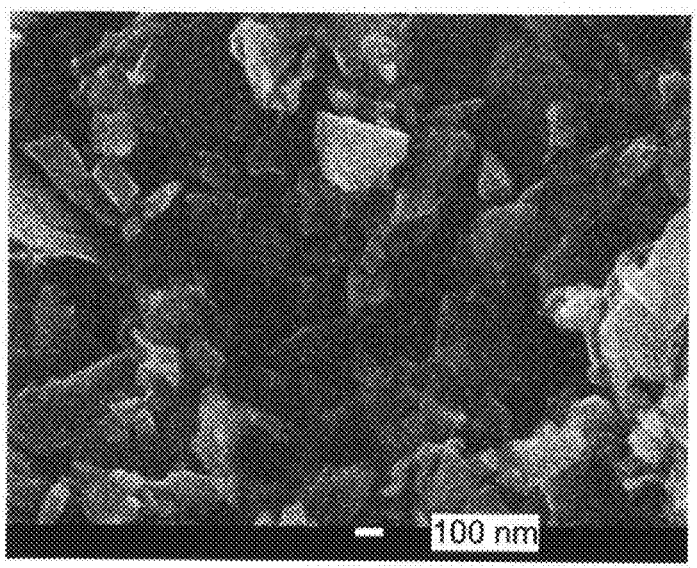

To a 500 cc vessel made of zirconia (manufactured by Fritsch Japan Co., Ltd.) were added 1 g of this LTO powder, 50 mL of ethanol, and balls of silicon nitride (total amount of approximately 500 g uniformly including 10 mm, 5 mmφ, and 2 mmφ balls), and crush was carried out with a planetary ball mill (P-6 Classic Line manufactured by Fritsch Japan Co., Ltd.) at 250 rpm for 18 hours. After ethanol was added so that the obtained liquid amounted to 500 mL, centrifugation was carried out at centrifuge force of 836×g for 15 minutes, and ethanol was evaporated in a vacuum drier so that the centrifuged liquid amounted to 100 mL. The condensed liquid was used as the second LTO solution. Moreover, half of the second LTO solution (50 mL) was transferred to another vessel and further dried in a vacuum dryer sufficiently to obtain LTO powder. This LTO powder was used as the second LTO particles. An SEM image of the second LTO particles is shown in FIG. 15B. It can be confirmed that the second LTO particles were sufficiently crushed compared with the first LTO particles. It was confirmed that nanosheets each having a thickness of several nanometers and a length of approximately several nanometers to 1 μm are included as shown in FIG. 15C by subjecting these second LOC particles to SEM observation at higher magnification.

Next, an alumina-coated SUS 304 foil was prepared by depositing an alumina film having a thickness of approximately 1 μm over a stainless SUS 304 foil (thickness of 20 μm) by an AD method. The LCO particles which will become the first particles were attached onto the alumina film surface. The first LCO particles were weighted with a micro-analytical balance (SHIMADZU, Model: AEM-5200) and transferred to a 50 cc glass vessel to which ethanol was added, a dispersion treatment was carried out with supersonic waves of 150 W and 20 KHz for one minute using an ultrasonic homogenizer (manufactured by SONIC & MATERIALS, model: VCX750), the dispersion was transferred to an air-brush painting system (manufactured by GSI Creos Corporation, PS311 Air Brush Set), the alumina-coated SUS 304 foil of a transfer plate prepared on a hot plate set at 70° C. in advance was spray-painted with the dispersion so that the first LCO particles were attached onto the surface of the alumina-coated SUS 304 foil.

Next, the second LTO particles and the first LTO particles were each weighted with a micro-analytical balance (SHIMADZU, Model: AEM-5200) so that the mixing ratio of the second LTO particles (volume occupied by the second particles/total volume of the first particles and the second particles) was approximately 25%, transferred to a 50 cc glass vessel to which ethanol was added, and subjected to a dispersion treatment with supersonic waves of 150 W and 20 KHz for one minute using an ultrasonic homogenizer (manufactured by SONIC & MATERIALS, model: VCX750) to prepare a dispersion. Similar to the first LTO particles, the alumina-coated SUS 304 film onto which the first LTO particles were attached was sprayed with the dispersion including the first and second LTO particles to attach the mixture of the first and second LTO particles onto the first LTO particles.

Next, the second LTO particles were attached onto the LTO particles in which the first and second LTO particles were mixed so that the mixing ratio of the first LTO particles and the second LTO particles initially attached by spraying fell between 15% and 35%. The second LTO dispersion was used for the spray-painting of the second LTO particles.

The alumina-coated SUS 304 foil onto which the first and second LTO particles were attached was retrieved from the hot plate and was subjected to a heating treatment at 350° C. under an atmosphere with a dew-point temperature of −75° C. or lower for 5 minutes.

A base material of a rectangular aluminum foil (area of 8 mm×12 mm, thickness of 13 μm) on which an Au film with a 400 nm thickness was formed by sputtering was prepared, the first and second LTO particles were pressed against a surface on which the Au film was formed by sputtering under air with a dew-point temperature of −40° C. or lower, and the pressure transfer was carried out to fix the first and second LTO particles onto the base material. This Au sputtering film is a barrier layer to inhibit the aluminum to react with $Li^+$ and may be a copper or Pt film highly resistant to $Li^+$. The fixing pressure is preferred to be lower than a pressure under which the raw-material particles are crushed and to be 2 GPa or lower. In this experiment, pressure of 420 MPa was applied. The pressure transfer of the first and second particles onto the aluminum foil base material from the alumina-coated SUS 304 foil was repeated four times, by which a highly dense LTO aggregate film was stacked over the aluminum foil. The thickness of the highly dense LTO aggregate film was approximately 5 μm. The negative electrode sheet was obtained by these methods.

A method for impregnating a polymer-based solid-state electrolyte into the positive electrode sheet and the negative electrode sheet and for bonding the positive electrode sheet and the negative electrode sheet with the polymer-based solid-state electrolyte to provide an all-solid-state lithium ion battery is explained. A commercially available "product name: all-solid-state polymer-based electrolyte" (a 20 wt % polymer-based electrolyte and a crosslinking initiator dissolved in acetonitrile) manufactured by OSAKA SODA CO., LTD.) was used as the polymer-based solid-state electrolyte. The ion conductivity of the all-solid-state polymer-based electrolyte synthesized in this experiment was $2\times10^{-5}$ S/cm.

Figure 16A:
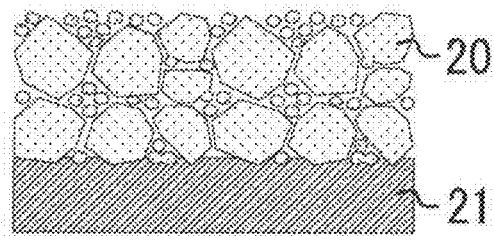
Figure 16B:
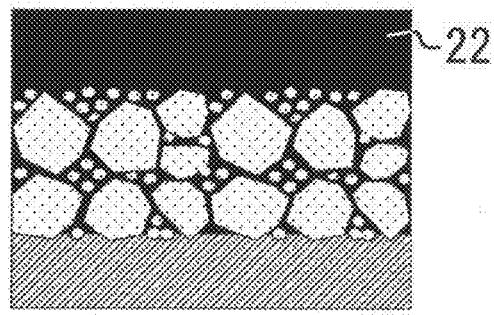
Figure 16C:
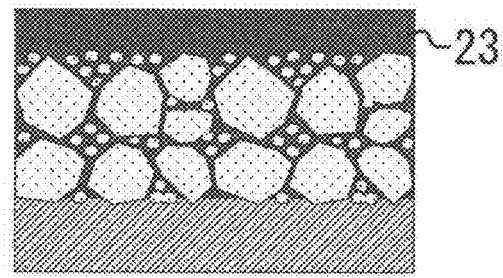
Figure 16D:
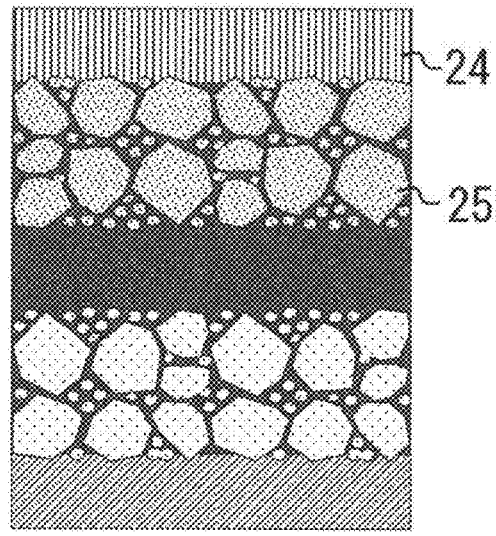
Figure 16E:
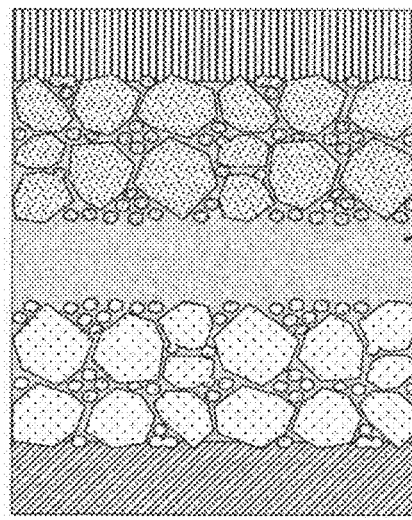

FIG. 16A is the negative electrode sheet. The specified amounts of the polymer-based electrolyte and the crosslinking initiator dissolved in acetonitrile were sufficiently mixed under air with a dew-point temperature of −40° C. or lower, and the solution was impregnated into the negative electrode sheet as shown in FIG. 16B. After that, acetonitrile was sufficiently evaporated to prepare the negative electrode sheet impregnated with the polymer-based electrolyte and the crosslinking initiator shown in FIG. 16C. The positive electrode sheet was also similarly impregnated, and acetonitrile was sufficiently evaporated to prepare the positive electrode sheet impregnated with the polymer-based electrolyte and the crosslinking initiator. These two positive and negative electrode sheets were bonded so as not to include air as shown in FIG. 16D, and the polymer-based electrolyte was crosslinked by performing a thermal treatment at an oxidation concentration of 50 ppm or lower at 70° C. for 1 hour to fabricate the all-solid-state lithium ion battery shown in FIG. 16E. The thickness of the polymer-based electrolyte layer provided between the positive electrode sheet and the negative electrode sheet was approximately 20 μm.

Figure 16F:
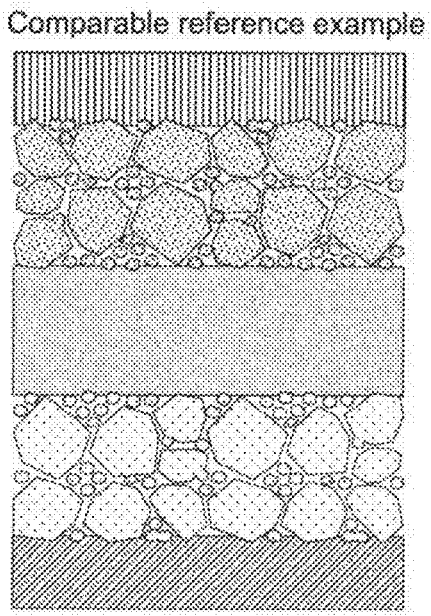
FIG. 16F is a schematic drawing of a solid-state battery including a sheet of a polymer-based solid-state electrolyte between a positive electrode sheet and the negative electrode sheet.

As a comparative reference example, an all-solid-state lithium ion battery having a commercially available all-solid-state polymer-based electrolyte sheet (ion conductivity: $5\times10^{-5}$ S/cm) with a 50 μm thickness between the positive electrode sheet and the negative electrode sheet, which is shown in FIG. 16F, was also fabricated.

Figure 17A:
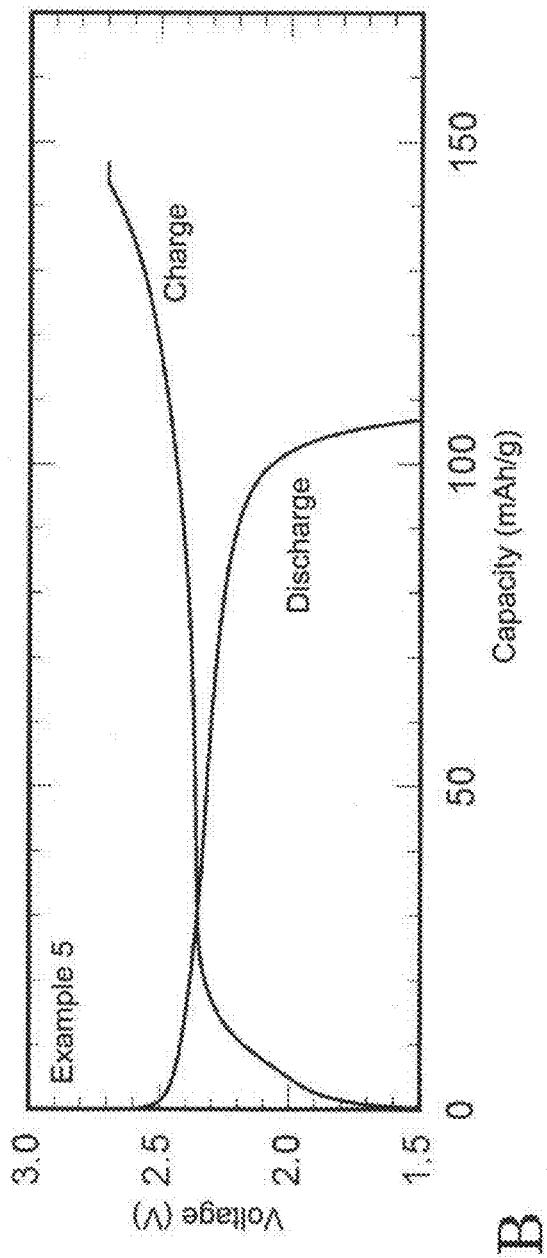
FIG. 17A and FIG. 17B are comparable drawings of the charge and discharge characteristics of the solid-state battery obtained by impregnating polymer-based electrolytes into a positive electrode sheet and a negative electrode sheet, bonding the positive electrode sheet and the negative electrode sheet with the polymer-based electrolytes provided on the surfaces of the sheets, and then crosslinking the polymer-based electrolytes and a solid-state battery including a sheet of a polymer-based solid-state electrolyte between a positive electrode sheet and a negative electrode sheet.
Figure 17B:
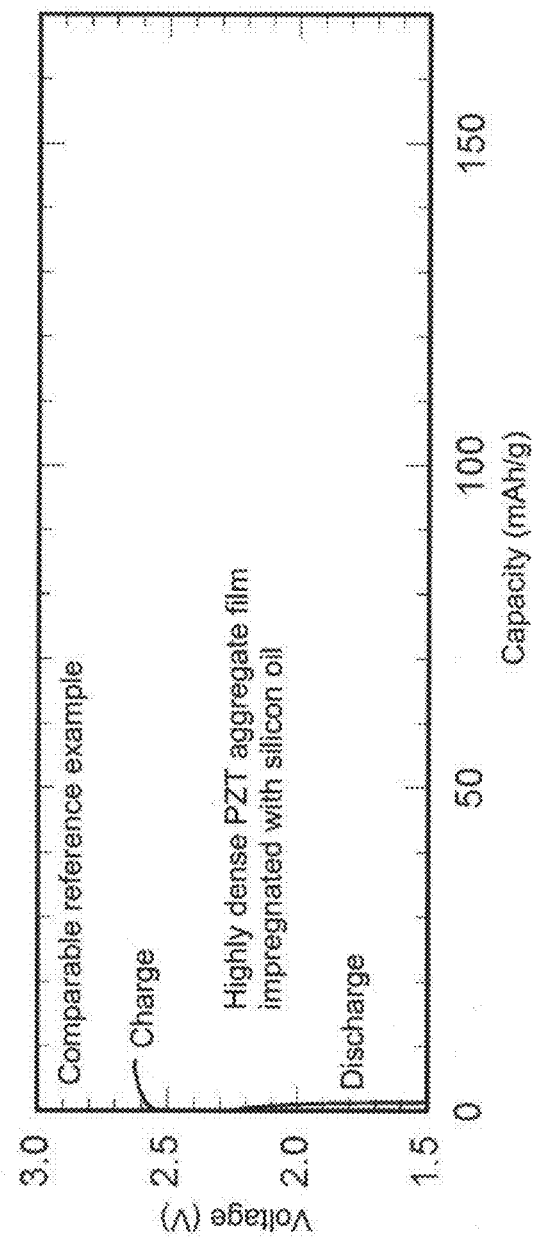

Charge-discharge curves of the fabricated all-solid-state lithium ion batteries are shown in FIG. 17A and FIG. 17B. The evaluation conditions were 25° C. and 0.01 C. A characteristic reflecting the charge-discharge curve of the typical LCO was obtained from the all-solid-state lithium ion battery in which the highly dense aggregate film was impregnated with the polymer-based solid-state electrolyte, and it was confirmed that charging and discharging are feasible at room temperature. On the other hand, the battery fabricated by sandwiching the all-solid-state polymer-based electrolyte sheet was not able to be sufficiently charged nor discharged.

From these results, it was proven that an oxide-based all-solid-state lithium ion battery operable even at room temperature can be fabricated by entirely impregnating a polymer-based solid-state electrolyte in the highly dense aggregate film.

<Example 6> Bendable all-Solid-State Lithium Ion Battery Having Flexibility

In traditional lithium ion batteries, high capacity is realized by accommodating a rolled electrode sheet in a housing as performed in the "quadrangular-prism lithium ion batteries" or by taking out and bonding terminals from edges of stacked battery sheets as performed in the "lamination-type lithium ion batteries". However, there is a problem whereby the shape of the whole of the battery is limited by the shape of the housing and the process to take out the terminals from the edges.

Figure 18A:
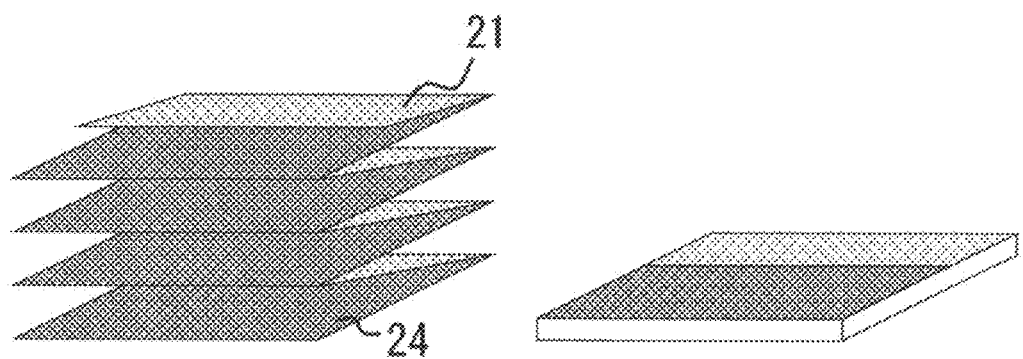
FIG. 18A and FIG. 18B are respectively schematic drawings of a solid-state battery manufactured by folding a battery sheet and a solid-state battery manufactured by stacking battery sheets having a folded shape.
Figure 18B:
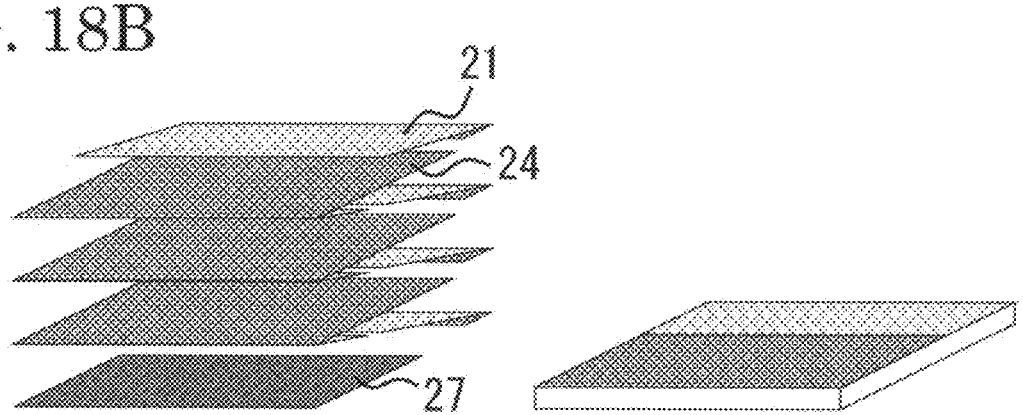

The inventors found that a bendable battery sheet having flexibility can be fabricated by using the highly dense aggregate film as an electrode layer, impregnating a polymer-based solid-state electrolyte into this structural member, and embedding ceramic particles in the polymer-based electrolyte layer. It is considered that the use of this battery sheet enables the production of a battery with a high degree of freedom in shape as exemplified by a folded battery shape demonstrated in FIG. 18A and a battery shape in which battery sheets folded at their edges are stacked as shown in FIG. 18B. In addition, it is also possible to directly take out both terminals of the positive and negative electrodes not only from the edge thereof but also from surfaces thereof in the case of the folded and stacked battery structure. Furthermore, a solid-state battery in which the whole of the stack of clothes including a resin such as CFRP and FRP and the folded battery sheets is covered with a crosslinked resin can be used as a structure member such as a case of a smartphone.

Figure 19A:
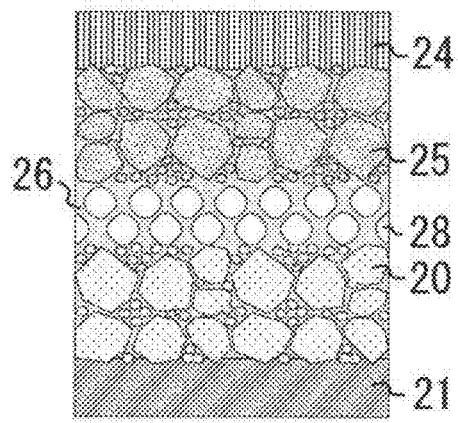
FIG. 19A is a schematic drawing of the solid-state battery including the polymer-based electrode layer embedded with the brittle material particles.

This bendable sheet having flexibility is preferred to include a polymer-based solid-state electrolyte layer embedding ceramic particles between the aforementioned positive electrode sheet and the negative electrode sheet impregnated with the polymer-based solid-state electrolyte as shown in FIG. 19A. These ceramic particles may be one which does not react with $Li^+$ during charge and discharge, such as SiC, SiO$_2$, Si$_3$N$_4$, and an oxide exemplified by alumina and zirconia. Moreover, a lithium ion conductor having a reduction potential lower than that of the negative electrode active material, such as Li$_7$La$_3$Zr$_2$O$_{12}$ of a garnet-type lithium ion conductor may be used. A particle diameter of the ceramic particles is preferred to be between 100 nm and 10 μm. A thickness of the polymer-based solid-state electrolyte layer embedding the ceramic particles is preferred to be from approximately 1 μm to 10 μm and may be between 100 nm and 50 μm. A content of the ceramic particles in the polymer-based solid-state electrolyte layer is preferred to be between 10% and 705 in the case where the ceramic particles are an oxide which does not exhibit lithium ion conductivity. In the case where the ceramic particles are a lithium ion conductor, the content may be between 10% and 80%, and the ceramic particles may be the highly dense aggregate.

Next, an example of a specific manufacturing method for the bendable all-solid-state lithium ion battery with flexibility is explained.

Alumina particles (SumicorundumAA-2 manufactured by Sumitomo Chemical Co., Ltd., average particle diameter: 2 μm) were attached on a surface of a stainless SUS 304 base material (thickness of 20 μm).

The AA-2 particles were weighted with a micro-analytical balance (SHIMADZU, Model: AEM-5200), transferred to a 50 cc glass vessel to which ethanol was added, and subjected to a dispersion treatment with supersonic waves of 150 W and 20 KHz for one minute using an ultrasonic homogenizer (manufactured by SONIC & MATERIALS, model: VCX750), and the dispersion was transferred to an air-brush painting system (manufactured by GSI Creos Corporation, PS311 Air Brush Set). A SUS 304 base material of a transfer plate prepared on a hot plate set at 60° C. in advance was spray-painted with the dispersion so that the AA-2 particles were attached onto the surface of the SUS 304 base material.

The SUS304 base material on which the AA-2 particles were attached was retrieved from the hot plate and subjected to a thermal treatment at 350° C. for 5 minutes under an environment of a dew-point temperature of −40° C. or lower, and then the AA-2 particles were pressed against a positive electrode sheet and a negative electrode sheet to perform the pressure transfer. The preparation of the positive electrode sheet and the negative electrode sheet was the same as that of Example 5. The pressure of the pressure transfer is preferred to be lower than a pressure under which the raw-material particles are crushed and to be 2 GPa or lower. In this experiment, pressure of 420 MPa was applied. The pressure transfer of the AA-2 particles onto the positive electrode sheet and the negative electrode sheet from the SUS 304 base material was carried out once.

Next, similar to Example 5, each of the positive electrode sheet and the negative electrode sheet on which the AA-2 was attached was impregnated with the 20 wt % of all-solid-state polymer-based electrolyte manufactured by OSAKA SODA CO., LTD., acetonitrile was sufficiently evaporated, the highly dense aggregate film of the positive electrode and the aggregate film of the negative electrode were bonded so that air is not included, and then a press pressure of 7 kN was applied to squeeze the excessive polymer-based electrolyte prior to crosslinking so that the battery sheet was prepared. The thickness of the polymer-based electrolyte layer was approximately 5 μm that was thinner than that of Example 5.

When the excessive polymer-based electrolyte was squeezed by the press treatment for the battery sheet including the polymer-based electrolyte layer containing no ceramic particles like that of Example 5, the highly dense aggregate film of the positive electrode and the aggregate film of the negative electrode came into contact and short-circuited.

Figure 19B:
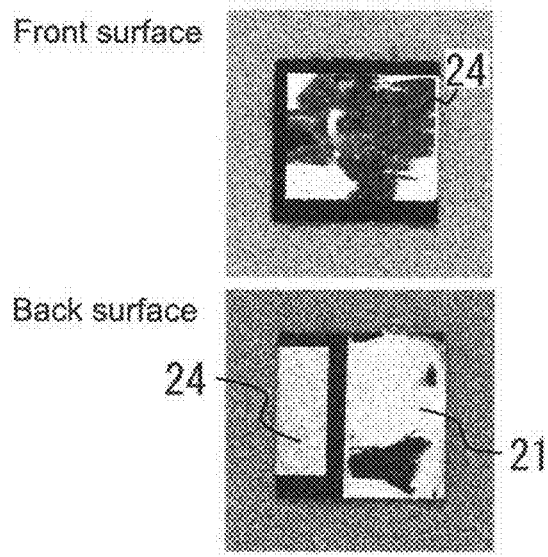
FIG. 19B and FIG. 19C are photographs of the solid-state battery having a folded shape.
Figure 19C:
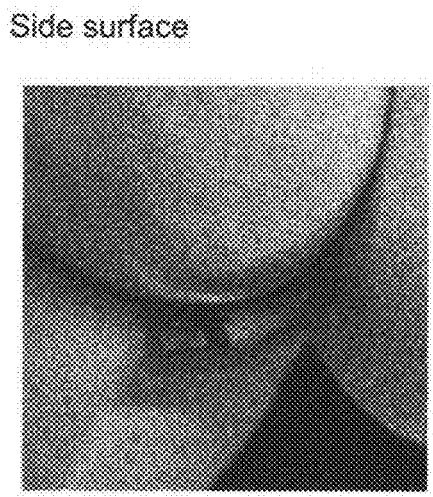
Figure 19D:
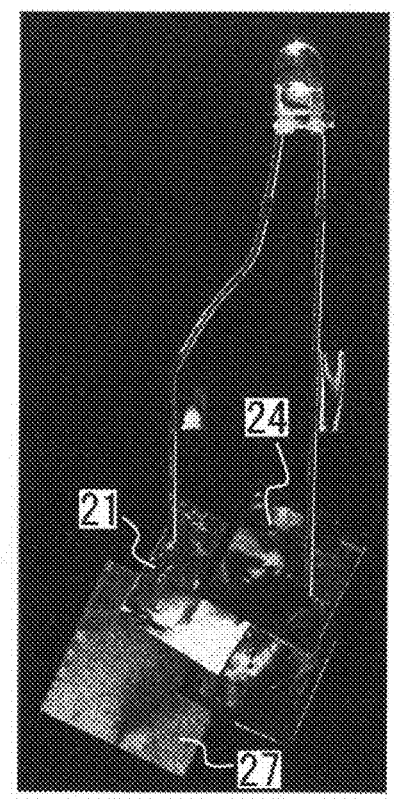
FIG. 19D is a photograph showing a state where the LED is turned on with the solid-state battery having a folded and stacked shape.

After an edge of the obtained battery sheet was folded by 180°, a thermal treatment was carried out at 70° C. for 1 hour under the conditions that the dew-point temperature was −70° C. or lower and the oxygen concentration was 50 ppm or lower to crosslink the polymer-based electrolyte so that the battery sheet was wholly transformed to a solid state. Photographs of the folded all-solid-state lithium ion battery sheet are shown in FIG. 19B and FIG. 19C. Furthermore, a photograph proving that an LED emits light when this folded all-solid-state lithium ion battery was charged and stacked as shown in FIG. 18B and then a LED was connected is shown in FIG. 19D.

Figure 20:
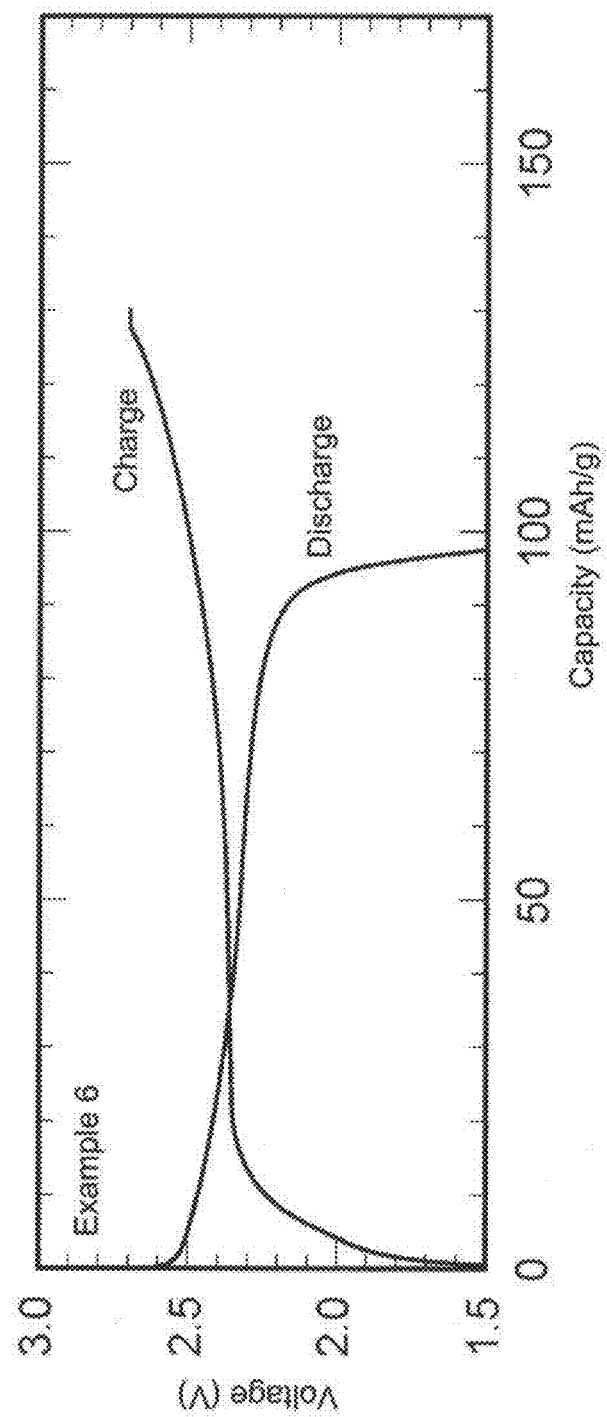
FIG. 20 is a drawing showing the charge and discharge characteristics of the solid-state battery having a folded shape.

The charge and discharge characteristics of the folded all-solid-state lithium ion battery sheet are shown in FIG. 20. The evaluation was carried out at 0.01 C and 25° C. The characteristics reflecting the unique charge-discharge curve of the LCO were confirmed. When the battery of Example 5 was similarly folded and transformed to the wholly solid state by crosslinking the polymer-based solid-state electrolyte as a comparable reference example, charging was not able to be achieved because the positive electrode and the negative electrode short-circuited. Furthermore, charging was also not able to be performed when the battery of Example 5 was folded because the positive electrode and the negative electrode short-circuited.

Figure 21:
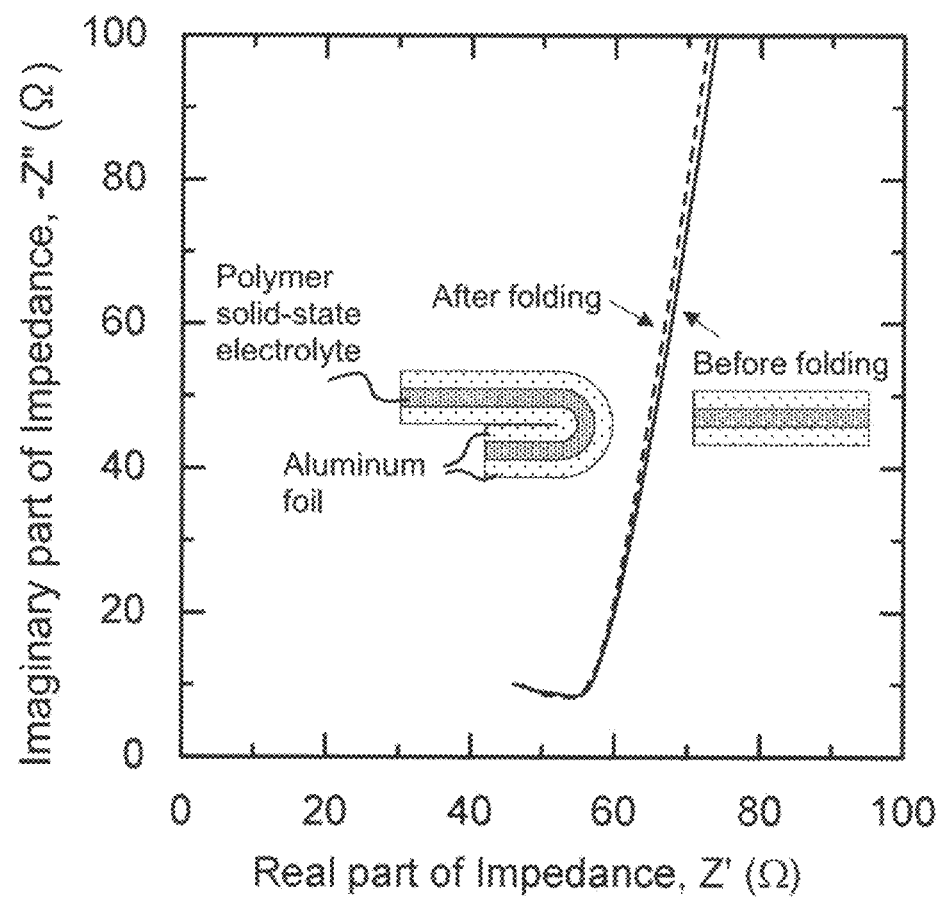
FIG. 21 is a comparable drawing of the impedance characteristics before and after folding the polymer-based solid-state electrolyte interposed between aluminum foils.

As a reference, comparison of impedance characteristics of a polymer-based solid-state electrolyte having a thickness of 9 μm and interposed between aluminum foils with a thickness of 13 μm before and after folding is shown in FIG. 21. Although this polymer-based solid-state electrolyte is sufficiently thinner than the polymer-based solid-state electrolyte of Example 5, no change was confirmed after the folding and the short circuit did not occur. It is considered that the reason that the battery of Example 5 short-circuited when folded is because the ceramic particles of the highly dense aggregate film of the positive electrode or the aggregate film of the negative electrode flowed to provide the polymer-based solid-state electrolyte with a high shearing force when the battery was folded, leading to the disconnection of the polymer-based solid-state electrolyte. Therefore, it is considered that the ceramic particles provided in the polymer-based electrolyte layer have an effect to suppress the flow of the positive and negative electrode active materials caused when the battery is folded.

From these results, it was confirmed that an all-solid-state lithium ion battery having flexibility and a folded shape can be manufactured.

What is claimed is:

1. A non-sintered highly dense aggregate of brittle material particles having interfaces at which the particles are bonded to each other and pores between the brittle material particles, wherein a porosity which is a volume ratio of the pores with respect to the whole of the non-sintered highly dense aggregate is equal to or less than 20%, wherein a volume ratio of the pores communicating with an apparent outer surface of the non-sintered highly dense aggregate with respect to a volume of all of the pores of the non-sintered highly dense aggregate is equal to or higher than 65%, wherein the brittle material particles include first particles and second particles smaller than the first particles, wherein the second particles are located in a first gap between the first particles bonding to each other, and wherein the non-sintered aggregate has a second gap between the plurality of second particles located in the first gap and between the second particles and the first particles.

2. The non-sintered highly dense aggregate according to claim 1, wherein the particle diameter size of the second particles is equal to or less than 1 μm.

3. The non-sintered highly dense aggregate according to claim 1, wherein an average pore width between the brittle material particles is equal to or less than 200 nm.

4. The non-sintered highly dense aggregate according to claim 1, wherein a silicon oil, a liquid in which nanoparticles with a particle diameter of 100 nm or less is dispersed, a liquid resin, or a solution of a polymer is impregnated.

5. The non-sintered highly dense aggregate according to claim 4, wherein the liquid resin impregnated in the highly dense aggregate is cured.

6. The non-sintered highly dense aggregate according to claim 1, wherein at least a part of the first particles and at least a part of the second particles are each in direct contact with a base material over which the non-sintered highly dense aggregate is placed.

7. The non-sintered highly dense aggregate according to claim 6, wherein the base material is a metal with an elastic modulus of 180 GPa or lower or carbon.

8. The non-sintered highly dense aggregate according to claim 1, wherein the first particles and the second particles distribute as a whole in a thickness direction of the non-sintered highly dense aggregate.

9. An electric element unit including, on both surfaces of a base material, at least one stack in which a film consisting of the non-sintered highly dense aggregate according to claim 1, an electrode layer, and a mesh foil having electric conductivity are stacked, wherein a resin or a polymer is impregnated in the highly dense aggregate.

10. The electric element according to claim 9, where the at least one stack includes a plurality of stacks.

11. A solid-state battery comprising the non-sintered highly dense aggregate of claim 1 in which a first polymer is impregnated, wherein the first polymer has ion conductivity.

12. The solid-state battery according to claim 11, further comprising a second polymer over the first polymer, wherein the second polymer has ion conductivity, and wherein the second polymer includes brittle material particles.

13. The solid-state battery according to claim 12, wherein the solid-state battery has a folded shape.

14. The solid-state battery according to claim 12, wherein the solid-state battery has a folded and stacked shape.

* * * * *